United States Patent
Narisawa et al.

(10) Patent No.: US 12,440,259 B2
(45) Date of Patent: Oct. 14, 2025

(54) TREATMENT SYSTEM AND CONTROL PARAMETER CALCULATION METHOD

(71) Applicant: OLYMPUS CORPORATION, Hachioji (JP)

(72) Inventors: Masato Narisawa, Hino (JP); Yuki Kawaguchi, Koshu (JP); Tomoyuki Takashino, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 667 days.

(21) Appl. No.: 17/852,911

(22) Filed: Jun. 29, 2022

(65) Prior Publication Data
US 2022/0323136 A1     Oct. 13, 2022

Related U.S. Application Data

(63) Continuation of application No. PCT/JP2020/003279, filed on Jan. 29, 2020.

(51) Int. Cl.
*A61B 18/12*     (2006.01)
*A61B 17/29*     (2006.01)
(Continued)

(52) U.S. Cl.
CPC ............ *A61B 18/085* (2013.01); *A61B 17/29* (2013.01); *A61B 17/320092* (2013.01);
(Continued)

(58) Field of Classification Search
CPC ............ A61B 17/29; A61B 17/320092; A61B 18/085; A61B 18/10; A61B 18/1206;
(Continued)

(56) References Cited

U.S. PATENT DOCUMENTS

| 2010/0324580 A1 | 12/2010 | Yamada |
| 2011/0036183 A1* | 2/2011 | Artale ............... A61B 90/06 |
| | | 73/862.621 |

(Continued)

FOREIGN PATENT DOCUMENTS

| JP | 4768883 B2 | 9/2011 |
| WO | 2018/047352 A1 | 3/2018 |

OTHER PUBLICATIONS

Mar. 31, 2020 International Search Report issued in International Application No. PCT/JP2020/003279.

*Primary Examiner* — Daniel W Fowler
(74) *Attorney, Agent, or Firm* — Oliff PLC

(57) ABSTRACT

A treatment system includes a treatment tool and a generator. The treatment tool includes a first grasper configured to apply treatment energy to a living tissue, and a second grasper. The generator includes a power circuit, a detecting circuit configured to detect an index value indicating a treatment state of a test material, and a processor configured to, based on the index value, measure a treatment completion time. At least one of the treatment tool and the generator further includes a memory configured to store property data which indicates a property of the test material, and based on the measured treatment completion time, the intensity of the treatment energy applied to the test material, and the property data, the processor is configured to calculate a control parameter related to the intensity of the treatment energy when the living tissue is treated, and output the control parameter to the power circuit.

8 Claims, 16 Drawing Sheets

(51) Int. Cl.
  *A61B 17/32*   (2006.01)
  *A61B 18/08*   (2006.01)
  *A61B 18/10*   (2006.01)
  *G16H 20/40*   (2018.01)
  *A61B 17/00*   (2006.01)
  *A61B 18/00*   (2006.01)

(52) U.S. Cl.
  CPC ............. *A61B 18/10* (2013.01); *G16H 20/40* (2018.01); *A61B 2017/00725* (2013.01); *A61B 2017/320094* (2017.08); *A61B 2018/00642* (2013.01); *A61B 2018/00791* (2013.01); *A61B 2018/00886* (2013.01)

(58) Field of Classification Search
  CPC .... A61B 18/1445; A61B 2017/320094; A61B 2018/00642; A61B 2018/00791; A61B 2018/00886
  See application file for complete search history.

(56) References Cited

U.S. PATENT DOCUMENTS

| | | | |
|---|---|---|---|
| 2013/0253480 A1* | 9/2013 | Kimball | A61B 90/90 606/1 |
| 2014/0257036 A1* | 9/2014 | Choi | A61B 18/1233 606/34 |
| 2015/0088125 A1* | 3/2015 | Wham | A61B 18/1206 606/40 |
| 2018/0256240 A1* | 9/2018 | Bloom | A61B 18/1445 |
| 2019/0209202 A1 | 7/2019 | Tsubuku et al. | |

* cited by examiner

TREATMENT SYSTEM AND CONTROL PARAMETER CALCULATION METHOD

CROSS-REFERENCE TO RELATED APPLICATION

This application is a continuation of International Application No. PCT/JP2020/003279, filed on Jan. 29, 2020, the entire contents of which are incorporated herein by reference.

BACKGROUND

1. Technical Field

The present disclosure is related to a treatment system and a control parameter calculation method.

2. Related Art

In the related art, a treatment system is known in which a region in a living tissue to be treated (hereinafter, called a target region) is treated by applying a treatment energy to the target region.

In an treatment system (an ultrasound surgery device), ultrasound energy is used as the treatment energy. That is, in the treatment system, the target region is treated by applying ultrasound vibrations to it. Moreover, in the treatment system, in order to deal with the issue that the vibration amplitude of the ultrasound vibrations undergoes changes since the time of shipment depending on the shelf life, calibration is performed using cavitation.

SUMMARY

In some embodiments, a treatment system including a treatment tool configured to apply, to a living tissue, treatment energy generated according to electrical power supplied to the treatment tool, the treatment tool including: a first grasper configured to apply the treatment energy to the living tissue, and a second grasper configured to grasp the living tissue along with the first grasper; and a generator including: a power circuit configured to supply the electrical power to the treatment tool, a detecting circuit configured to detect an index value indicating a treatment state of a test material which is grasped between the first grasper and the second grasper and to which the treatment energy is applied from the first grasper, and a processor configured to, based on the detected index value, measure a treatment completion time spanning from a start of application of the treatment energy to the test material to a completion of a specific treatment in the test material, wherein: at least one of the treatment tool and the generator further includes a first memory configured to store property data that indicates (i) a property of the test material and (ii) a relationship between an intensity of the treatment energy applied to the test material and the treatment completion time, and based on the measured treatment completion time, the intensity of the treatment energy applied to the test material, and the stored property data, the processor is configured to calculate a control parameter related to the intensity of the treatment energy when the living tissue is treated, and output the calculated control parameter to the power circuit to control the supply of the electrical power to the treatment tool.

In some embodiments, provided is a control parameter calculation method implemented by a processor of a generator. The method includes measuring a treatment completion time spanning from a start of application of treatment energy to a test material to a completion of specific treatment in the test material, the treatment completion time being based on an index value indicating a treatment state of the test material that is grasped between a first grasper and a second grasper and to which treatment energy is applied from the first grasper; calculating a control parameter related to an intensity of the treatment energy when the living tissue is treated based on the measured treatment completion time, the intensity of the treatment energy applied to the test material, and property data, the property data indicating a property of the test material and indicating a relationship between the intensity of the treatment energy applied to the test material and the treatment completion time; and outputting the calculated control parameter to a power circuit to control supply of electrical power to a treatment tool.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
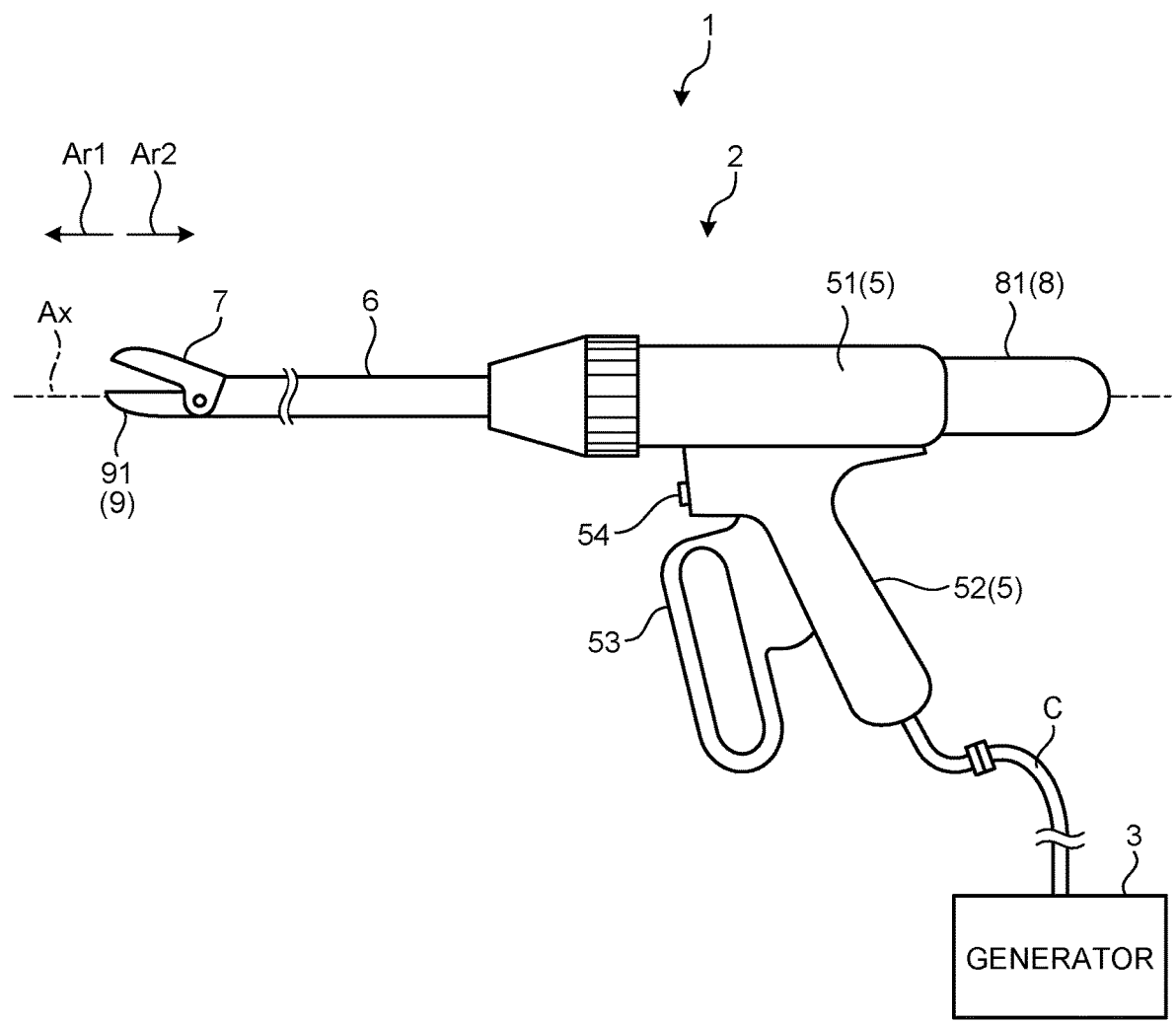
FIG. 1 is a diagram illustrating a treatment system according to a first embodiment.

Exemplary embodiments of the disclosure are described below with reference to the accompanying drawings. However, the disclosure is not limited by the embodiments described below. Moreover, in the drawings, identical constituent elements are referred to by the same reference numerals.

First Embodiment

Schematic Configuration of Treatment System

Figure 2:
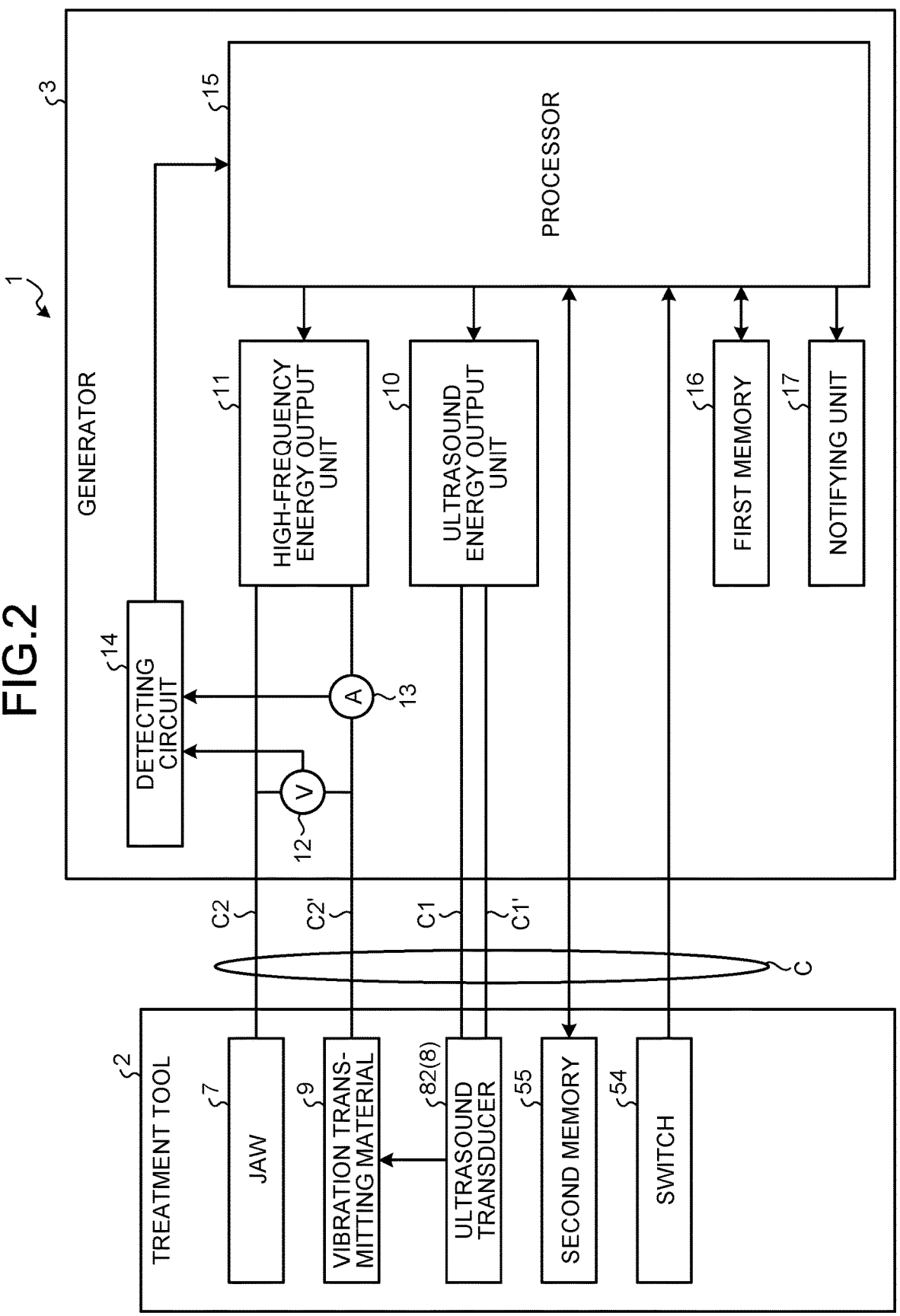
FIG. 2 is a block diagram illustrating a configuration of the treatment system.

FIG. 1 is a diagram illustrating a treatment system 1 according to a first embodiment. FIG. 2 is a block diagram illustrating a configuration of the treatment system 1.

The treatment system 1 treats a region in a living tissue to be treated (hereinafter, called a target region) by applying ultrasound energy and high frequency energy to the target region. Herein, the treatment implies, for example, coagulation and incision of the target region. As illustrated in FIGS. 1 and 2, the treatment system 1 includes a treatment tool 2, a generator 3, and a test sheet 4 (see FIG. 4).

Configuration of Treatment Tool

In the following explanation about the configuration of the treatment tool 2; along a central axis Ax of a sheath 6 (see FIG. 1), one side is referred to as a leading end side Ar1 and the other side is referred to as a base end side Ar2.

The treatment tool 2 is a medical treatment tool that, in the state of being pierced through the abdominal wall, is used to treat the target region; and that is connected in a detachably-attachable manner to the generator 3 by an electrical cable C. As illustrated in FIGS. 1 and 2, the treatment tool 2 includes a holding case 5, the sheath 6, a jaw 7, a transducer unit 8, and a vibration transmitting material 9.

The holding case 5 supports the entire treatment tool 2. As illustrated in FIG. 1, the holding case 5 includes a holding case body 51 that is substantially cylindrical in shape and that is coaxial with the central axis Ax; and includes a fixed handle 52 that extends downward from the holding case body 51 with reference to FIG. 1, and that is gripped by the operator such as a medical practitioner.

As illustrated in FIG. 1, the holding case 5 has a movable handle 53 and a switch 54 provided thereon.

The movable handle 53 receives the opening-closing operation performed by the operator such as a medical practitioner, and is disposed to be movable in the direction of moving closer to the fixed handle 52 and the direction of moving away from the fixed handle 52.

The switch 54 receives an output start operation performed by the operator such as a medical practitioner. Then, via the electrical cable C, the switch 54 outputs, to the generator 3, an operation signal corresponding to the output start operation.

The holding case 5 has a second memory 55 (see FIG. 2) disposed therein.

The second memory 55 is used to store history information indicating the calculation history of the control parameter (the calculation count of the control parameter) as obtained by the generator 3, and to store the control parameter calculated by the generator 3. Regarding the control parameter, the detailed explanation is given later.

The sheath 6 has a substantially cylindrical shape in whole. Of the sheath 6, some part on the base end side Ar2 is inserted inside the holding case body 51 from the leading end side Ar1. With that, the sheath 6 gets attached to the holding case 5.

Figure 3:
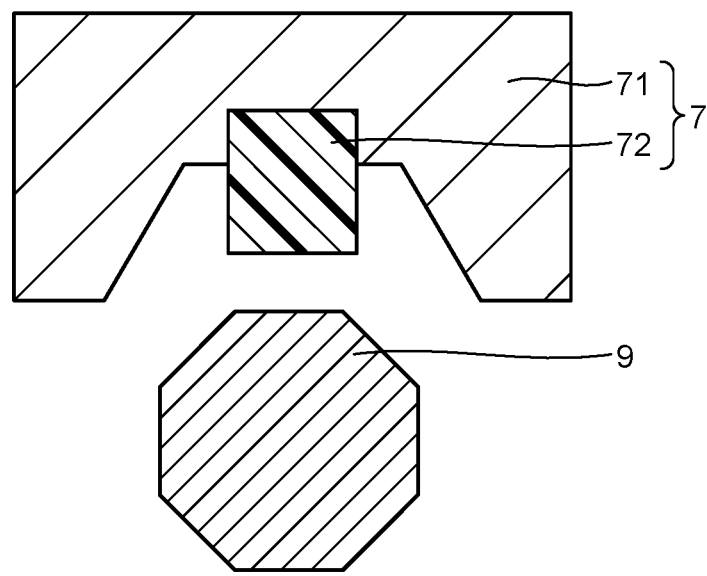
FIG. 3 is a diagram illustrating a configuration of a jaw.

FIG. 3 is a diagram illustrating a configuration of the jaw 7. More particularly, FIG. 3 is a cross-sectional view obtained when the jaw 7 and the vibration transmitting material 9 are cut open along the plane orthogonal to the central axis Ax.

The jaw 7 is rotatably attached to the end portion on the leading end side Ar1 of the sheath 6, and the target region gets grasped between the jaw 7 and the end portion on the leading end side Ar1 of the vibration transmitting material 9 (i.e., a treatment portion 91 (see FIG. 1)). Meanwhile, inside the holding case body 51 and the sheath 6, an opening-closing mechanism (not illustrated) is disposed that, in response to an opening-closing operation of the movable handle 53 by the operator such as a medical practitioner, opens or closes the jaw 7 with respect to the treatment portion 91. The jaw 7 is made of an electroconductive material and, as illustrated in FIG. 3, includes a jaw body 71 that is attached to be rotatable with respect to the sheath 6; and includes a plastic pad 72 attached to that face of the jaw body 71 which lies opposite to the vibration transmitting material 9. The pad 72 has the insulating property. Hence, even when the incision of the target region is completed and the jaw 7 abuts against the vibration transmitting material 9, short circuit is prevented from occurring between the jaw body 71 and the vibration transmitting material 9. Moreover, even when the incision of the target region is completed and the jaw 7 abuts against the vibration transmitting material 9, any damage attributed to the collision of the ultrasoundally-activated vibration transmitting material 9 with the jaw body 71 is prevented from occurring.

Meanwhile, the jaw 7 is equivalent to a second grasper.

As illustrated in FIGS. 1 and 2, the transducer unit 8 includes a transducer case 81 (see FIG. 1) and an ultrasound transducer 82 (see FIG. 2).

The transducer case 81 linearly extends along the central axis Ax. When the end portion thereof on the leading end side Ar1 is inserted inside the holding case body 51 from the base end side Ar2 of the holding case body 51, the transducer case 81 gets attached to the holding case 5.

The ultrasound transducer 82 is housed in the transducer case 81. In the state in which the transducer case 81 is attached to the holding case 5, the ultrasound transducer 82 is mechanically connected to the end portion on the base end side Ar2 of the vibration transmitting material 9 via a horn (not illustrated). The ultrasound transducer 82 generates ultrasound vibrations under the control of the generator 3. In the first embodiment, the ultrasound vibrations are longitudinal vibrations occurring in the direction along the central Ax. Although not illustrated in detail, the ultrasound transducer 82 is configured using a bolted Langevin type transducer (BLT) that includes a plurality of piezoelectric elements laminated along the central axis Ax.

The vibration transmitting material 9 is made of an electroconductive material and has an elongated shape that linearly extends along the central axis Ax. As illustrated in FIG. 1, the vibration transmitting material 9 is inserted in the sheath 6, with the treatment portion 91 protruding to the outside. The end portion on the base end side Ar2 of the vibration transmitting material 9 is mechanically connected to the ultrasound transducer 82 via a horn (not illustrated). The vibration transmitting material 9 transmits the ultrasound vibrations, which are generated by the ultrasound transducer 82, from the end portion of the base end side Ar2 to the treatment portion 91. With that, the ultrasound vibrations are applied from the treatment portion 91 to the target region, and the target region gets treated. In other words, the vibration transmitting material 9 applies ultrasound energy to the target region from the treatment portion 91, so that the target region gets treated. Herein, the vibration transmitting material 9 is equivalent to a first grasper. Moreover, the ultrasound energy is equivalent to treatment energy.

Configuration of Generator

The generator 3 comprehensively controls the operations of the treatment tool 2 via the electrical cable C. As illustrated in FIG. 2, the generator 3 includes an ultrasound energy output unit 10, a high-frequency energy output unit 11, a voltage detecting unit 12, a current detecting unit 13, a detecting circuit 14, a processor 15, a first memory 16, and a notifying unit 17.

When the treatment tool 2 is connected to the generator 3 using the electrical cable C, the ultrasound energy output unit 10 gets electrically connected to the ultrasound transducer 82 via a pair of first current pathways C1 and C1' that constitute the electrical cable C. Then, under the control of the processor 15, the ultrasound energy output unit 10 supplies alternating-current power (i.e., the driving current that defines the vibration amplitude of the treatment portion 91) to the ultrasound transducer 82 via the pair of current pathways C1 and C1'. As a result, the ultrasound transducer 82 generates ultrasound vibrations. The treatment portion 91 vibrates at the vibration amplitude that corresponds to the driving current. Herein, the ultrasound energy output unit 10 is equivalent to a power circuit.

When the treatment tool 2 is connected to the generator 3 using the electrical cable C, the high-frequency energy output unit 11 gets electrically connected to the jaw body 71 and the vibration transmitting material 9 via a pair of second current pathways C2 and C2' that constitute the electrical cable C. Then, under the control of the processor 15, the high-frequency energy output unit 11 supplies a high-frequency voltage and a high-frequency current in the portion between the jaw body 71 and the vibration transmitting material 9 via the pair of second current pathways C2 and C2'. As a result, a high-frequency current flows to the target region that is grasped between the jaw body 71 and the treatment portion 91. In other words, high-frequency energy is applied to the target region. Thus, the jaw body 71 and the vibration transmitting material 9 also function as high-frequency electrodes.

The voltage detecting unit 12 sequentially detects the high-frequency voltage being supplied from the high-frequency energy output unit 11 to the jaw body 71 and the vibration transmitting material 9 via the pair of second current pathways C2 and C2'. Then, the voltage detecting unit 12 outputs, to the detecting circuit 14, an HF voltage signal corresponding to the detected high-frequency voltage.

The current detecting unit 13 sequentially detects the high-frequency current being supplied from the high-frequency energy output unit 11 to the jaw body 71 and the vibration transmitting material 9 via the pair of second current pathways C2 and C2'. Then, the current detecting unit 13 outputs, to the detecting circuit 14, an HF current signal corresponding to the detected high-frequency current.

Based on the HF voltage signals output from the voltage detecting unit 12 and based on the HF current signals output from the current detecting unit 13; the detecting circuit 14 detects the impedance value (hereinafter, referred to as the HF impedance) of the target region, which is grasped between the jaw 7 and the end portion on the leading end side Ar1 of the vibration transmitting material 9, and the test sheet 4. Herein, the HF impedance is equivalent to an "index value indicating a treatment state of a test material". Then, the detecting circuit 14 outputs the detected HF impedance to the processor 15.

The processor 15 is, for example, a central processing unit (CPU) or a field-programmable gate array (FPGA), and controls the overall operations of the treatment system 1 according to a computer program stored in the first memory 16. Regarding the detailed functions of the processor 15, the explanation is given later in a section called "control parameter calculation method".

The first memory 16 is used to store the computer program to be executed by the processor 15, and to store the information required by the processor 15 for performing operations. For example, the information required by the processor 15 for performing operations contains: property data indicating the properties of the test sheet 4; a reference completion time; a reference amplitude; and first slope information. Regarding the property data, the reference completion time, the reference amplitude, and the first slope information; the detailed information is given later in the section called "control parameter calculation method".

The notifying unit 17 notifies predetermined information under the control of the processor 15. Examples of the notifying unit 17 include: a light emitting diode (LED) that notifies predetermined information by illumination or blinking or by using colored illumination; a display device that displays predetermined information; and a speaker that outputs predetermined information in the form of sounds.

Configuration of Test sheet

Figure 4:
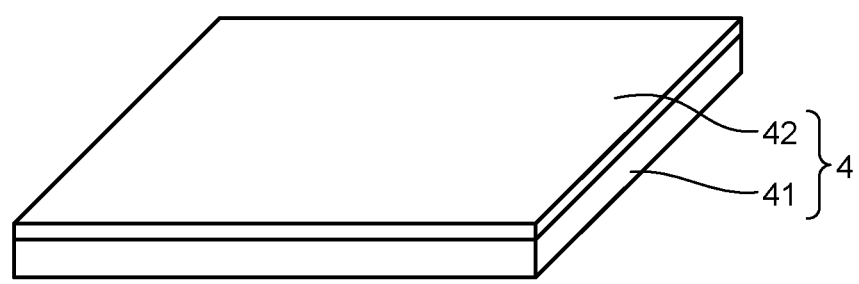
FIG. 4 is a diagram illustrating a configuration of a test sheet.

FIG. 4 is a diagram illustrating a configuration of the test sheet 4.

In the control parameter calculation method explained later, the test sheet 4 is used to calculate the control parameter. The control parameter is related to the intensity of the treatment energy that is applied to the target region during its treatment. In the first embodiment, the driving current that defines the vibration amplitude of the ultrasound vibrations (the vibration amplitude of the treatment portion 91) applied to the target region during its treatment (i.e., the driving current supplied to the ultrasound transducer 82 during the treatment of the target region (hereinafter, referred to as the driving current for treatment purpose)) represents the control parameter. Thus, the control parameter is related to the vibration amplitude of the ultrasound vibrations, and is equivalent to an ultrasound parameter.

As illustrated in FIG. 4, the test sheet 4 is formed by laminating a first layer 41 and a second layer 42.

The first layer 41 is made of thermoplastic resin having high heat resistance (for example, melting point: 270° C. or higher). With respect to the ultrasound energy that is applied, the first layer 41 has the properties equivalent to the target region that is actually treated.

The second layer 42 is made of an electroconductive material such as an aluminum foil. Alternatively, the second layer 42 can be formed by way of plating, or can be made of electroconductive rubber having high heat resistance (for example, melting point: 400°).

Control Parameter Calculation Method

Given below is the explanation of the control parameter calculation method implemented by the processor 15.

The control parameter calculation method explained below is implemented at the site, such as a hospital, at which the treatment tool 2 is actually used.

Figure 5:
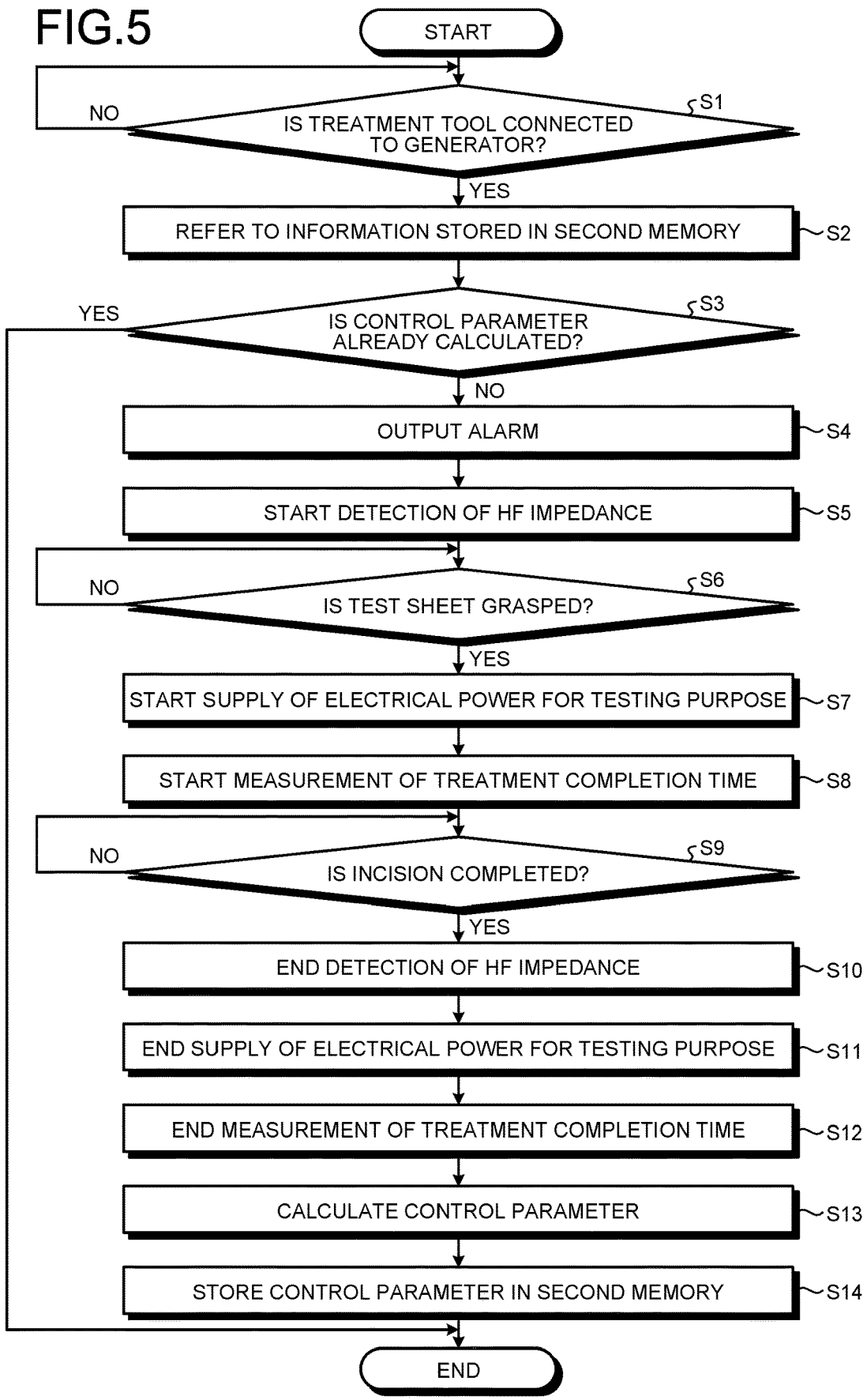
FIG. 5 is a flowchart for explaining a control parameter calculation method.

FIG. 5 is a flowchart for explaining the control parameter calculation method.

Firstly, the processor 15 constantly monitors whether or not the treatment tool 2 is connected to the generator 3 via the electrical cable C (Step S1).

If it is determined that the treatment tool 2 is connected (Yes at Step S1); then, via the electrical cable C, the processor 15 refers to the information stored in the second memory 55 (Step S2).

After the operation at Step S2 is performed, as a result of referring to the information stored in the second memory 55, the processor 15 determines whether or not the control parameter is stored in the second memory 55, that is, whether or not the control parameter has already been calculated (Step S3).

If it is determined that the control parameter has already been calculated (Yes at Step S3), then the processor 15 ends the control flow.

On the other hand, if it is determined that the control parameter is not yet calculated (No at Step S3), then the processor 15 controls the operations of the notifying unit 17 for notifying (outputting an alarm indicating) that the test sheet 4 is to be grasped using the treatment tool 2 (Step S4).

Then, in response to the notification, the operator such as a medical practitioner holds the treatment tool 2 in a hand, and performs an opening-closing operation with respect to the movable handle 53. As a result, the test sheet 4 gets grasped between the jaw 7 and the treatment portion 91, with the orientation in which the first layer 41 is positioned on the side of the vibration transmitting material 9 and the second layer 42 is positioned on the side of the jaw 7.

After the operation at Step S4 is performed, the processor 15 controls the operations of the high-frequency energy output unit 11, and supplies high-frequency power at a constant level to the jaw body 71 and the vibration transmitting material 9. The high-frequency power represents the electrical power of a magnitude at which the test sheet 4 does not undergo thermal denaturation. Then, the processor 15 controls the operations of the detecting circuit 14 and starts the detection of the HF impedance (Step S5).

After the operation at Step S5 is performed, based on the HF impedance detected by the detecting circuit 14, the processor 15 constantly monitors whether or not the test sheet 4 is grasped using the treatment tool 2 (Step S6).

If it is determined that the test sheet 4 is grasped (Yes at Step S6), then the processor 15 controls the operations of the ultrasound energy output unit 10, and starts the supply of the electrical power for testing purpose (the driving current for testing purpose) to the ultrasound transducer 82 (Step S7). As a result, the ultrasound transducer 82 generates ultrasound vibrations. Then, the treatment tool 2 vibrates at the vibration amplitude corresponding to the driving current for testing purpose. Herein, the driving current for testing purpose is equivalent to the "intensity of the treatment energy applied to the test material". Then, the ultrasound vibrations are applied from the treatment portion 91 to the test sheet 4, and it marks the start of the incision of the first layer 41.

At the same time of performing the operation at Step S7, the processor 15 starts measuring the time taken for completing the incision of the first layer 41 (hereinafter, referred to as the treatment completion time) (Step S8).

After the operation at Step S8 is performed, the processor 15 constantly monitors whether or not the incision of the first layer 41 is completed (Step S9). The incision of the first layer 41 is equivalent to the "specific treatment in the test material".

Figure 6:
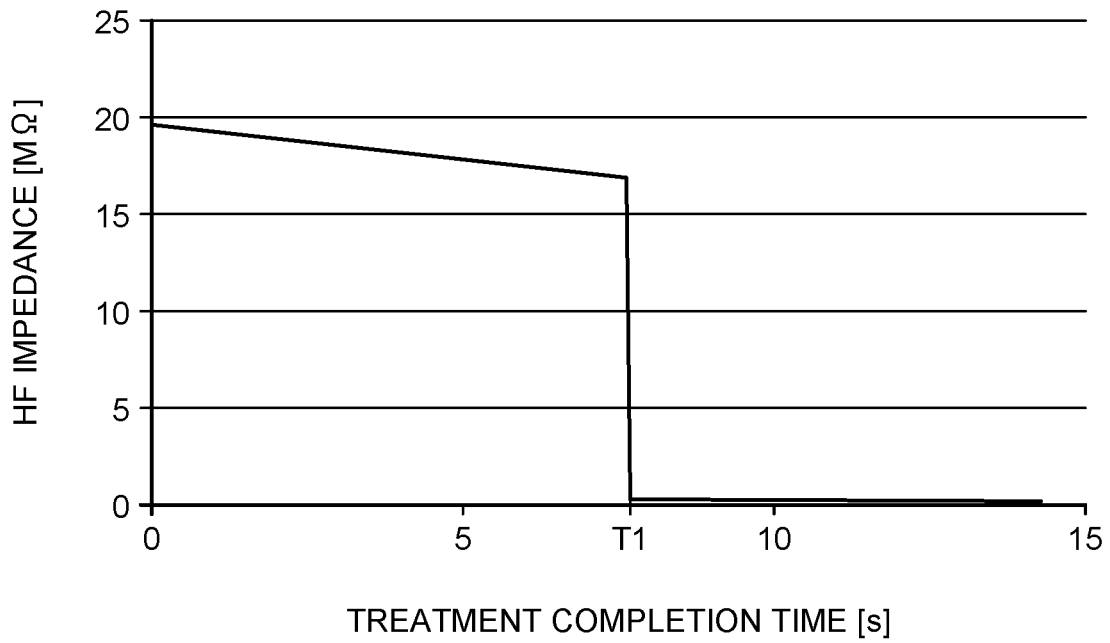
FIG. 6 is a diagram for explaining the operation performed at Step S9.

FIG. 6 is a diagram for explaining the operation performed at Step S9. More particularly, FIG. 6 is a diagram illustrating the behavior of the HF impedance after the operations at Steps S7 and S8 are performed.

As illustrated in FIG. 6, after the operations at Steps S7 and S8 are performed, the HF impedance gradually decreases accompanying the gradual fading of the first layer 41. Once the first layer 41 is incised, the jaw body 71 and the vibration transmitting material 9 become electrically continuous because of the second layer 42. That is, once the first layer 41 is incised (at a timing T1 illustrated in FIG. 6), the HF impedance declines sharply.

In the first embodiment, at Step S9, if the HF impedance detected by the detecting circuit 14 exhibits the abovementioned behavior (a sharp decline), then the processor 15 determines that the incision of the first layer 41 is completed.

If it is determined that the incision of the first layer 41 is completed (Yes at Step S9), then the processor 15 stops the operations of the high-frequency energy output unit 11 and the detecting circuit 14, and ends the detection of the HF impedance (Step S10).

At the same time of performing the operation at Step S10, the processor 15 stops the operations of the ultrasound energy output unit 10 and ends the supply of the electrical power for testing purpose to the ultrasound transducer 82 (Step S11).

Moreover, in an identical manner to the operations at Steps S10 and S11, the processor 15 ends the measurement of the treatment completion time (Step S12).

After the operation at Step S12 is performed, the processor 15 calculates the control parameter (the driving current for treatment purpose) based on the following: the treatment completion time measured at Step S8 to Step S12; the driving current for testing purpose that is supplied to the ultrasound transducer 82 at Step S7 to Step S11; and the property data, the reference completion time, the reference amplitude, and the first slope information stored in the first memory 16 (Step S13).

Figure 7:
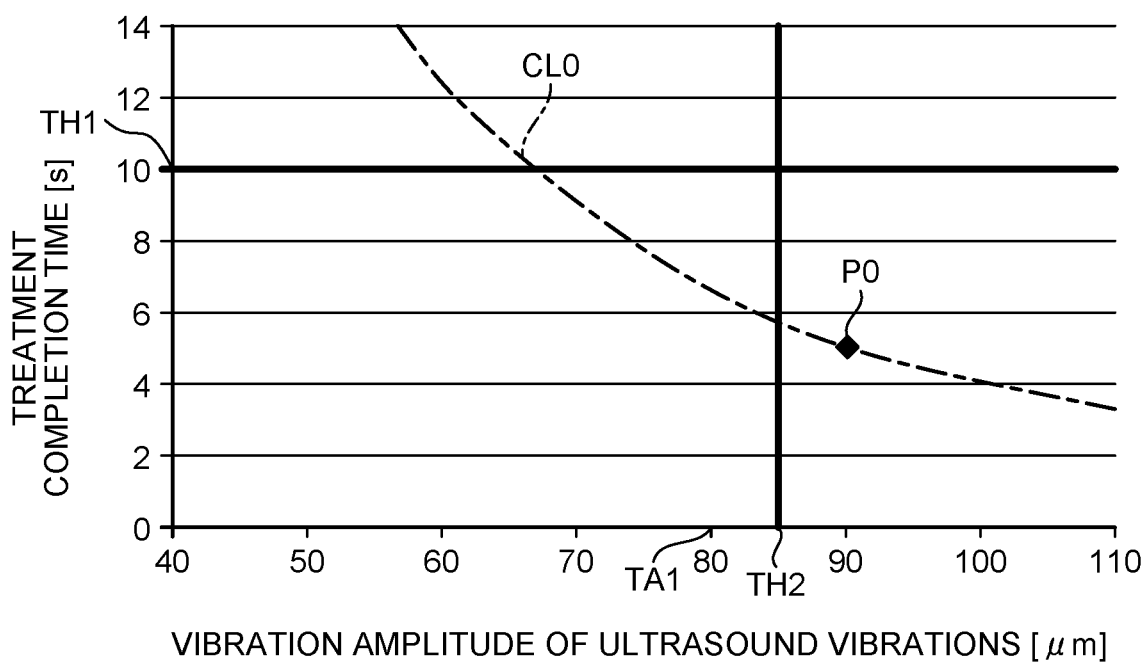
FIG. 7 is a diagram for explaining the operation performed at Step S13.

FIG. 7 is a diagram for explaining the operation performed at Step S13. More particularly, in FIG. 7, the horizontal axis represents the vibration amplitude [µm] of the ultrasound vibrations, and the vertical axis represents the treatment completion time [s].

In the example illustrated in FIG. 7, the property data stored in the first memory 16 is indicted by a curved line CL0. More particularly, the property data indicates the relationship between the vibration amplitude of the ultrasound vibrations applied to the test sheet 4 and the treatment completion time spanning from the application of the ultrasound vibrations to the test sheet 4 to the incision of the first layer 41 of the test sheet 4. With reference to the curved line CL0 illustrated in FIG. 7, when the ultrasound vibrations having the vibration amplitude of 100 [µm] are applied to the test sheet 4, the incision of the first layer 41 of the test sheet 4 is completed in the treatment completion time of 4 [s]. Moreover, with reference to the curved line CL0 illustrated in FIG. 7, when the ultrasound vibrations having the vibration amplitude of 60 [µm] are applied to the test sheet 4, the incision of the first layer 41 of the test sheet 4 is completed in the treatment completion time of 12 [s].

The reference completion time stored in the first memory 16 represents the reference value of the treatment completion time. The reference completion time meets the user demand that the treatment gets completed at least within the reference completion time. In the example illustrated in FIG. 7, a reference completion time TH1 is set to 10 [s].

The reference amplitude stored in the first memory 16 represents the reference value of the vibration amplitude of the treatment portion 91. The reference amplitude is set in order to keep the load on the treatment tool 2, which is attributed to the ultrasound vibrations, to or below a specific amount of load. In the example illustrated in FIG. 7, a reference amplitude TH2 is set to 85 [µm].

The driving current supplied to the ultrasound transducer 82 has a linear relationship with the vibration amplitude of the treatment portion 91. In that linear relationship, the first slope information, which is stored in the first memory 16, indicates the ratio of the variation in the vibration amplitude of the treatment portion 91 with respect to the variation in the driving current (i.e., indicates the slope in the linear relationship).

At Step S13, the processor 15 calculates the control parameter (the driving current for treatment purpose) in the following manner.

Firstly, based on the treatment completion time measured at Step S8 to Step S12 and based on the property data stored in the first memory 16, the processor 15 figures out the vibration amplitude of the actual vibrations of the treatment portion 91 occurring due to the driving current for testing purpose that is supplied to the ultrasound transducer at Step S7 to Step S11 (hereinafter, referred to as the in-testing vibration amplitude). In the example illustrated in FIG. 7, the treatment completion time of 5 [s] is measured at Step S8 to Step S12. Hence, the processor 15 figures out that the vibration amplitude of 90 [μm] corresponding to the period of 5 [s] in the curved line CL0 represents the in-testing vibration amplitude. In the example illustrated in FIG. 7, a point P0 represents the point corresponding to the treatment completion time measured at Step S8 to Step S12 and the in-testing vibration amplitude.

Then, based on the property data, the reference completion time, and the reference amplitude stored in the first memory 16; the processor 15 sets the vibration amplitude (hereinafter, referred to as the in-treatment vibration amplitude) of the treatment portion 91 when the target region is treated. More particularly, the processor 15 sets, as the in-treatment vibration amplitude, the vibration amplitude that corresponds to the treatment completion time equal to or shorter than the reference completion time and that is equal to or smaller than the reference amplitude in the curved line CL0 representing the property data. In the example illustrated in FIG. 7, for example, the vibration amplitude of 80 [μm] is set as an in-treatment vibration amplitude TA1 that is in the range between and including the vibration amplitude of 68 [μm] corresponding to the reference completion time TH1 of 10 [s] in the curved line CL0 and a reference amplitude TH2 of 85 [μm] in the curved line CL0.

Subsequently, based on the correspondence relationship between the driving current for testing purpose supplied to the ultrasound transducer 82 at Step S7 to Step S11 and the in-testing vibration amplitude, and based on the first slope information stored in the first memory 16 (i.e., the information indicating the ratio of the variation in the vibration amplitude of the treatment portion 91 with respect to the variation in the driving current); the processor 15 calculates the driving current for treatment purpose (the control parameter) that is required to obtain the in-treatment vibration amplitude TA1 set in the manner explained above.

After the operation at Step S13 is performed, the processor 15 stores the control parameter (the driving current for treatment purpose), which is calculated at Step S13, in the second memory 55 via the electrical cable C; and updates the history information stored in the second memory 55 (Step S14). Then, the processor 15 ends the present control flow.

Subsequently, when treating the target region in response to an output start operation performed by the operator, such as a medical practitioner, using the switch 54; the processor 15 refers to the control parameter (the driving current for treatment purpose) stored in the second memory 55, and supplies the driving current for treatment purpose to the ultrasound transducer 82. As a result, ultrasound vibrations at the in-treatment vibration amplitude TA1 occur in the treatment portion 91, and the ultrasound vibrations get applied to the target region.

Meanwhile, the treatment tool 2 constituting the treatment system 1 can be configured to be discarded after one use, or can be configured to be repeatedly used for a plurality of number of times. When the treatment tool 2 is to be configured to be repeatedly used for a plurality of number of times, for example, it becomes necessary to remanufacture the treatment tool 2 according to, for example, a reprocessing method illustrated in FIG. 8.

Reprocessing Method

Figure 8:
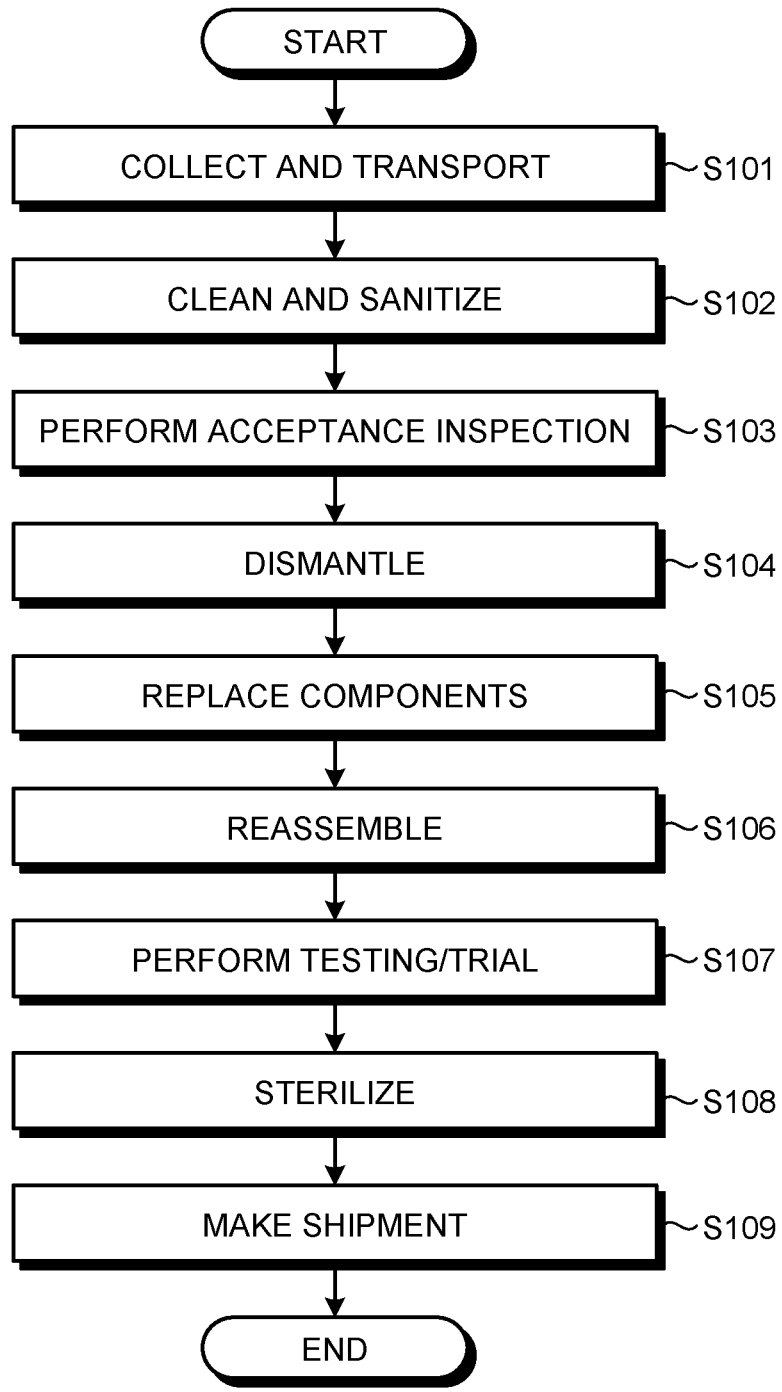
FIG. 8 is a flowchart for explaining a reprocessing method.

FIG. 8 is a flowchart for explaining the reprocessing method.

Firstly, the vendor who would perform the remanufacturing collects the used treatment tool 2, which was used in treatment, and transports it to a factory (Step S101). Then, the vendor cleans and sterilizes the used treatment tool 2 that has been collected and transported (Step S102), and performs acceptance inspection (Step S103). Subsequently, the vendor dismantles the treatment tool 2 (Step S104), and replaces specific components (the exhausted components during the treatment, or the dirty components) with new components (Step S105). Then, the vendor reassembles the components (Step S106); performs testing/trial (Step S107) and sterilization (Step S108); and again ships the treatment tool 2 (Step S109).

Meanwhile, after the remanufacturing is performed, the control parameter (the driving control for treatment) stored in the second memory 55 is deleted.

According to the first embodiment described above, the following effects are achieved.

In the treatment system 1 according to the first embodiment, the generator 3 applies the high frequency energy from the treatment portion 91 to the test sheet 4 that is grasped between the jaw 7 and the treatment portion 91, and at the same time detects the index value (the HF impedance) indicating the treatment state of the test sheet 4. Based on that index value, the processor 15 constituting the generator 3 measures the treatment completion time required for completing a specific treatment in the test sheet 4. Then, based on the measured treatment completion time, the driving current for testing purpose, and the property data stored in the first memory 16; the processor 15 calculates the control parameter related to the intensity of the high frequency energy when the target region is treated (i.e., calculates the driving current that defines the vibration amplitude of the ultrasound vibrations).

Thus, as a result of using the control parameter when treating the target region, it becomes possible to treat the target region within the desired treatment completion time, and to achieve the desired treatment performance.

The treatment tool 2 constituting the treatment system 1 includes the second memory 55 that is used to store the history information about the calculation history of the calculation parameter.

Thus, at Step S103, if the vender who remanufactures the treatment tool 2 refers to the history information, the remanufacturing count can be known. That is, by referring to the history information, the vendor becomes able to determine whether or not the treatment tool 2 has exceeded the maximum remanufacturing count. Moreover, since the control parameter calculation method is implemented at the site such as a hospital at which the treatment tool 2 is actually used, it becomes possible to simplify, for example, the testing/trial performed at Step S107 of the reprocessing method.

Second Embodiment

Given below is the description of a second embodiment.

In the following explanation, the identical configuration to the first embodiment is referred to by the same reference numerals, and the detailed explanation is either not given again or given in a simplified manner.

Figure 9:
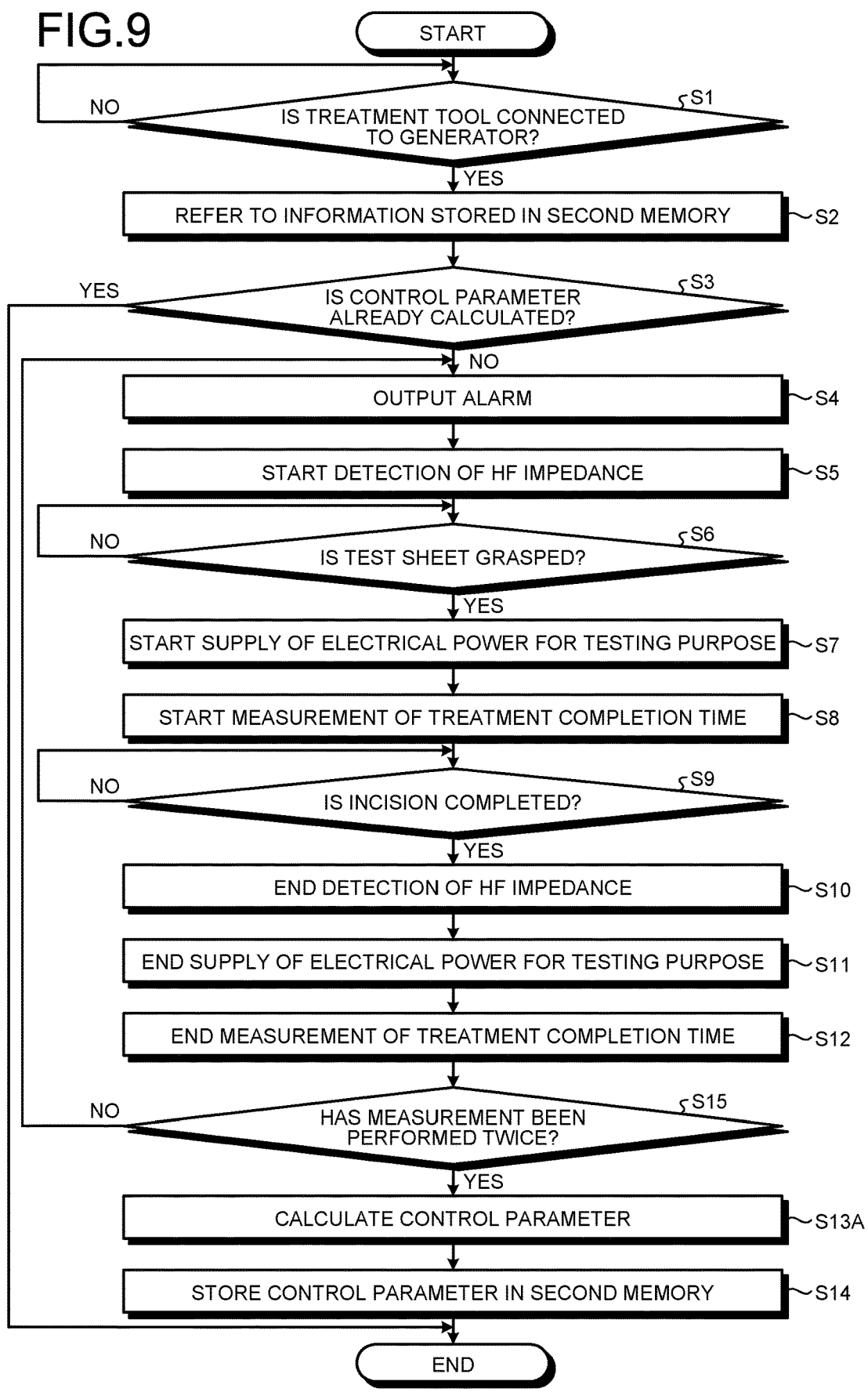
FIG. 9 is a flowchart for explaining the control parameter calculation method according to a second embodiment.

FIG. 9 is a flowchart for explaining the control parameter calculation method according to the second embodiment.

In the second embodiment, as illustrated in FIG. 9, the control parameter calculation method is different as compared to the first embodiment described above.

In comparison to the control parameter calculation method according to the first embodiment, in the control parameter calculation method according to the second embodiment, as illustrated in FIG. 9, the operation at Step S15 is additionally performed and the operation at Step S13 is substituted with an operation at Step S13A. Hence, the following explanation is focused on the operations performed at Steps S15 and S13A.

The operation at Step S15 is performed after the operation performed at Step S12.

At Step S15, the processor 15 determines whether or not the operations in the loop from Step S4 to Step S12 have been performed twice.

More particularly, in the second embodiment, two test sheets 4 are used that have mutually identical properties with respect to the high frequency energy applied thereto (i.e., at the first time of the loop from Step S4 to Step S12, one of the two test sheets 4 is used; and, at the second time of the loop, the other test sheet 4 is used). Moreover, two different values of the driving current for testing purpose are supplied to the ultrasound transducer 82, so that ultrasound vibrations having different vibration amplitudes are applied to the two test sheets 4. Then, for each of test sheet 4, the treatment completion time taken for incising the corresponding first layer 41 is measured.

In the following explanation, in the first time of the loop from Step S4 to Step S12, the driving current for testing purpose supplied to the ultrasound transducer 82 at Step S7 to Step S11 is referred to as a first driving current for testing purpose, and the treatment completion time measured at Step S8 to Step S12 is referred to as a first treatment completion time. Similarly, in the second time of the loop from Step S4 to Step S12, the driving current for testing purpose supplied to the ultrasound transducer 82 at Step S7 to Step S11 is referred to as a second driving current for testing purpose, and the treatment completion time measured at Step S8 to Step S12 is referred to as a second treatment completion time. The first driving current for testing purpose is equivalent to a first intensity, and the second driving current for testing purpose is equivalent to a second intensity.

The operation at Step S13A is performed when it is determined at Step S15 that the operations in the loop from Step S4 to Step S12 have been performed twice.

More particularly, at Step S13A, the processor 15 calculates the control parameter (the driving current for treatment purpose) based on: the first treatment completion time; the second treatment completion time; the first driving current for testing purpose; the second driving current for testing purpose; and a plurality of sets of property data, the reference completion time, the reference amplitude, and the first slope information stored in the first memory 16. Then, the system control proceeds to Step S14.

Figure 10:
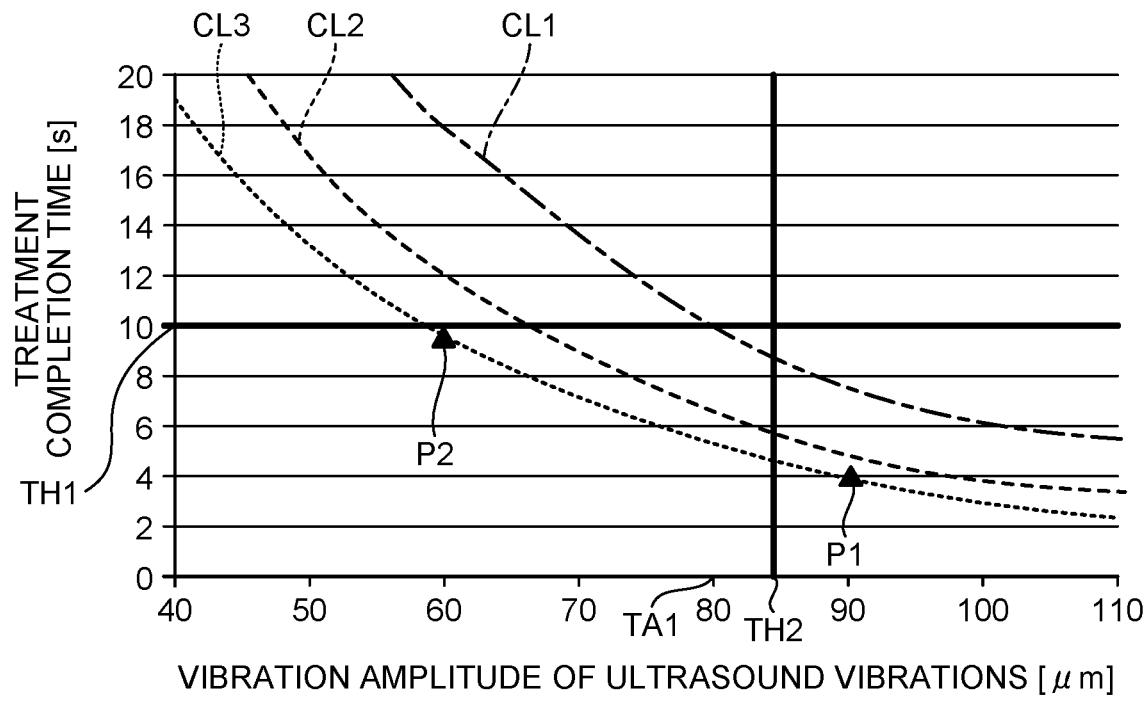
FIG. 10 is a diagram for explaining the operation performed at Step S13A.

FIG. 10 is a diagram for explaining the operation performed at Step S13A. More particularly, in FIG. 10, in an identical manner to FIG. 7, the horizontal axis represents the vibration amplitude [μm] of the ultrasound vibrations, and the vertical axis represents the treatment completion time [s].

In the second embodiment, in the first memory 16, a plurality of sets of property data is stored in the first memory 16. The sets of property data correspond to a plurality of mutually different grasping forces attributed to the jaw 7 and the treatment portion 91. In the example illustrated in FIG. 10, the sets of property data are indicated by curved lines CL1 to CL3. The property data indicted by the curved line CL1 in FIG. 10 corresponds to the grasping force of 15 [N]. The property data indicted by the curved line CL2 in FIG. 10 corresponds to the grasping force of 20 [N]. The property data indicted by the curved line CL3 in FIG. 10 corresponds to the grasping force of 25 [N]. As is clear from the curved lines CL1 to CL3, even when the ultrasound vibrations having the same vibration amplitude are applied to the test sheet 4, if the grasping force is different, then the treatment completion time changes (higher the grasping force, the shorter becomes the treatment completion time).

At Step S13A, the processor 15 calculates the control parameter (the driving current for treatment purpose) in the following manner.

Firstly, based on the first treatment completion time, based on the first driving current for testing purpose, based on the second treatment completion time, based on the second driving current for testing purpose, and based on a plurality of sets of property data and the first slope information stored in the first memory 16; the processor 15 figures out the following: the extent of the grasping force attributed to the jaw 7 and the treatment portion 91; the extent of the vibration amplitude of the actual vibrations of the treatment portion 91 occurring due to the first driving current for testing purpose (hereinafter, referred to as a first in-testing vibration amplitude); and the extent of the vibration amplitude of the actual vibrations of the treatment portion 91 occurring due to the second driving current for testing purpose (hereinafter, referred to as a second in-testing vibration amplitude). In the example illustrated in FIG. 10, the first treatment completion time is equal to 4 [s] and the second treatment completion time is equal to 9.5 [s]. Thus, according to the variation (of 5.5 [s]) between the first treatment completion time and the second treatment completion time, and according to the variation between the first in-testing vibration amplitude and the second in-testing vibration amplitude estimated from the variation between the first driving current for testing purpose and the second driving current for testing purpose and from the first slope information; the processor 15 figures out that the point corresponding to the first treatment completion time and the estimated first in-testing vibration amplitude lies on the curved line CL3, and that the point corresponding to the second treatment completion time and the estimated second in-testing vibration amplitude also lies on the curved line CL3. That is, the processor 15 figures out that the grasping power attributed to the jaw 7 and the treatment portion 91 is equal to 25 [N]. Moreover, the processor 15 figures out that the vibration amplitude of 90 [μm] corresponding to the first treatment completion time of 4 [s] in the curved line CL3 represents the first in-testing vibration amplitude. Furthermore, the processor 15 figures out that the vibration amplitude of 60 [μm] corresponding to the second treatment completion time of 9.5 [s] in the curved line CL3 represents the second in-testing vibration amplitude. In the example illustrated in FIG. 7, a point P1 represents the point corresponding to the first treatment completion time and the first in-testing vibration amplitude, and a point P2 represents the point corresponding to the second treatment completion time and the second in-testing vibration amplitude.

Then, the processor 15 sets the in-treatment vibration amplitude based on the following: from among a plurality of sets of data stored in the first memory 16, the property data corresponding to grasping force (in the example illustrated in FIG. 10, the property data of the curved line CL3); the reference completion time; and the reference amplitude. More particularly, the processor 15 sets, as the in-treatment vibration amplitude, the vibration amplitude that corresponds to the treatment completion time in the curved line CL3 equal to or shorter than the reference completion time and that is equal to or smaller than the reference amplitude. In the example illustrated in FIG. 10, as the in-treatment vibration amplitude TA1, for example, the vibration amplitude of 80 [μm] is set that is within the range between and including the vibration amplitude of 58 [μm], which corresponds to the reference completion time TH1 of 10 [s] in the curved line CL3, and the reference amplitude TH2 of 85 [μm].

Then, the processor 15 calculates the driving current for treatment purpose (the control parameter), which is required for obtaining the in-treatment vibration amplitude TA1 set as explained above, based on: either the correspondence relationship between the first driving current for testing purpose and the first in-testing vibration amplitude, or the correspondence relationship between the second driving current for testing purpose and the second in-testing vibration amplitude; and the first slope information stored in the first memory 16.

According to the second embodiment, the following effects are achieved in addition to achieving the effects according to the first embodiment.

As illustrated in FIG. 10, even when the ultrasound vibrations having the same vibration amplitude are applied to the test sheet 4, if the grasping force attributed to the jaw 7 and the treatment portion 91 is different, then the treatment completion time changes. Sometimes the grasping force undergoes changes since the time of shipment depending on the shelf life.

In the second embodiment, the processor 15 measures the first treatment completion time within which the first layer 41 is incised due to the vibration amplitude of the ultrasound vibrations corresponding to the first driving current for testing purpose, and measures the second treatment completion time within which the first layer 41 is incised due to the vibration amplitude of the ultrasound vibrations corresponding to the second driving current for testing purpose. Then, the processor 15 calculates the control parameter based on: the first treatment completion time; the second treatment completion time; the first driving current for testing purpose; the second driving current for testing purpose; and the property data stored in the first memory 16.

Thus, even if the grasping force has changed since the time of shipment depending on the shelf life, it becomes possible to calculate the appropriate control parameter corresponding to the changed grasping force.

Third Embodiment

Given below is the explanation of a third embodiment.

In the following explanation, the identical configuration to the first and second embodiments is referred to by the same reference numerals, and the detailed explanation is either not given again or given in a simplified manner.

Figure 11:
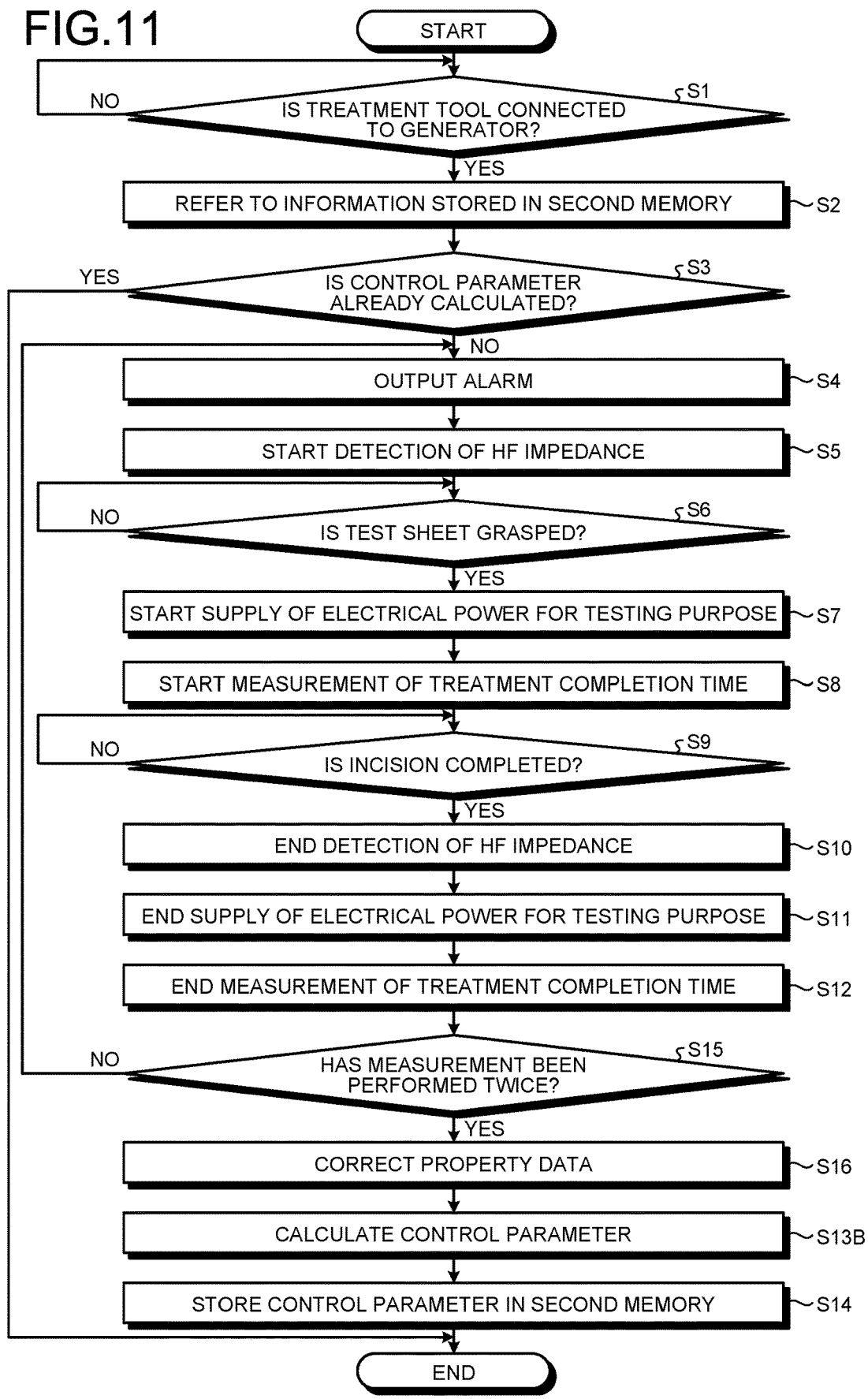
FIG. 11 is a flowchart for explaining the control parameter calculation method according to a third embodiment.

FIG. 11 is a flowchart for explaining the control parameter calculation method according to the third embodiment.

In the third embodiment, as illustrated in FIG. 11, the control parameter calculation method is different as compared to the first and second embodiments described above.

In comparison to the parameter calculation method according to the second embodiment, in the parameter calculation method according to the second embodiment (see FIG. 9), as illustrated in FIG. 11, the operation at Step S16 is additionally performed and the operation at Step S13A is substituted with an operation at Step S13B. Hence, the following explanation is focused on the operations performed at Steps S16 and S13B.

The operation at Step S16 is performed when it is determined at Step S15 that the operations in the loop from Step S4 to Step S12 have been performed twice.

Figure 12:
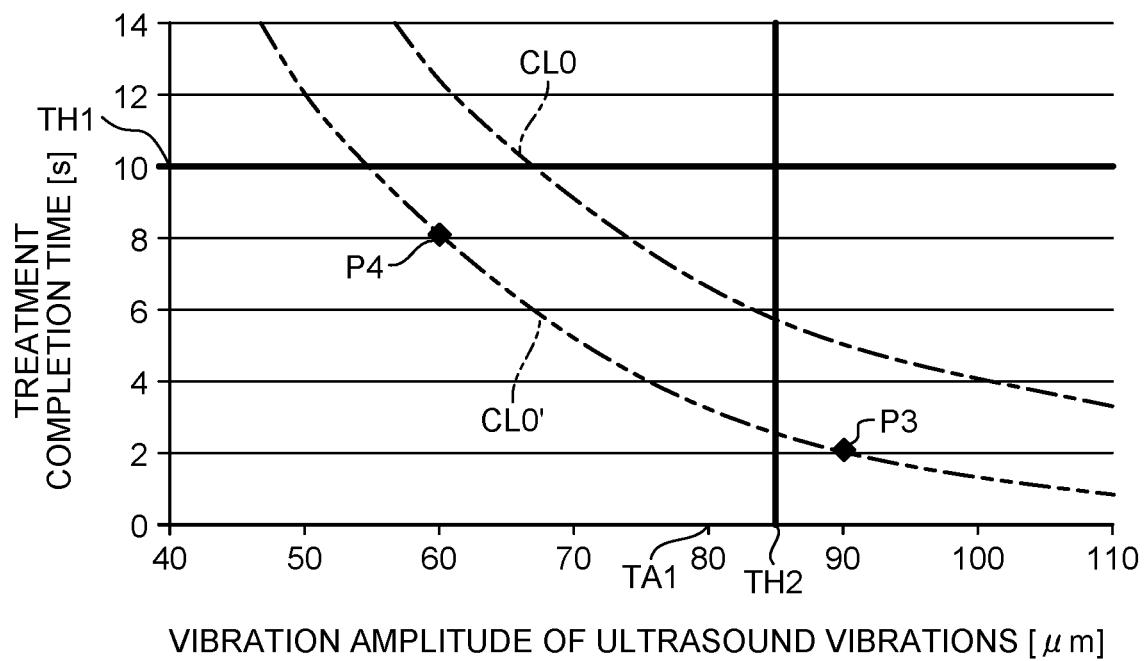
FIG. 12 is a diagram for explaining the operation performed at Step S16.

FIG. 12 is a diagram for explaining the operation performed at Step S16. More particularly, in FIG. 12, in an identical manner to FIGS. 7 and 10, the horizontal axis represents the vibration amplitude [μm] of the ultrasound vibrations, and the vertical axis represents the treatment completion time [s].

In the third embodiment, in an identical manner to the first embodiment, only one set of property data indicated by the curved line CL0 (see FIG. 12) is stored in the first memory 16.

At Step S16, the processor 15 corrects the property data, which is indicated by the curved line CL0 and which is stored in the first memory 16, based on: the first treatment completion time; the second treatment completion time; the first driving current for testing purpose; the second driving current for testing purpose; and the first slope information stored in the first memory 16. In the example illustrated in FIG. 12, the first treatment completion time is equal to 2 [s] and the second treatment completion time is equal to 8 [s]. Thus, according to the variation (of 6 [s]) between the first treatment completion time and the second treatment completion time, and according to the variation between the first in-testing vibration amplitude and the second in-testing vibration amplitude estimated from the variation between the first driving current for testing purpose and the second driving current for testing purpose and from the first slope information; the processor 15 moves the curved line CL0 in the direction along the vertical axis or in the direction along the horizontal axis, until the point corresponding to the first treatment completion time and the estimated first in-testing vibration amplitude as well as the point corresponding to the second treatment completion time and the estimated second in-testing vibration amplitude lies on a curved line CL0' (see FIG. 12), which represents the result of moving the curved line CL0. Then, the processor 15 treats the curved line CL0' as the post-correction property data.

After the operation at Step S16 is performed, the processor 15 calculates the control parameter (the driving current for treatment) based on: the first treatment completion time; the second treatment completion time; the first driving current for testing purpose; the second driving current for testing purpose; the property data corrected at Step S16; and the reference completion time, the reference amplitude, and the first slope information stored in the first memory 16. Then, the system control proceeds to Step S14.

Firstly, the processor 15 figures out the first vibration amplitude for testing purpose based on the first treatment completion time and based on the property data corrected at Step S16 (in the example illustrated in FIG. 12, the property data indicated by the curved line CL0'). In the example illustrated in FIG. 12, the processor 15 figures out that the vibration amplitude of 90 [μm] corresponding to the first treatment control time of 2 [s] in the curved line CL0' represents the first vibration amplitude. Moreover, the processor 15 figures out the second vibration amplitude for testing purpose based on the second treatment completion time and based on the property data corrected at Step S16. In the example illustrated in FIG. 12, the processor 15 figures out that the vibration amplitude of 60 [μm] corresponding to the second treatment control time of 8 [s] in the curved line CL0' represents the second vibration amplitude. In the example illustrated in FIG. 12, a point P3 represents the point corresponding to the first treatment completion time and the first in-testing vibration amplitude, and a point P4 represents the point corresponding to the second treatment completion time and the second in-testing vibration amplitude.

Subsequently, based on the property data corrected at Step S16 (in the example illustrated in FIG. 12, the property data indicated by the curved line CL0') and based on the reference completion time and the reference amplitude stored in the first memory 16, the processor 15 sets the in-treatment vibration amplitude. More particularly, the processor 15 sets, as the in-treatment vibration amplitude, the vibration amplitude that corresponds to the treatment completion time equal to or shorter than the reference completion time and that is equal to or smaller than the reference amplitude. In the example illustrated in FIG. 12, for example, the vibration amplitude of 80 [μm] is set as the in-treatment vibration amplitude TA1 that is in the range between and including the vibration amplitude of 55 [μm] corresponding to the reference completion time TH1 of 10 [s] in the curved line CL0' and the reference amplitude TH2 of 85 [μm].

Then, the processor 15 calculates the in-treatment driving current (the control parameter), which is required for obtaining the in-treatment vibration amplitude TA1 set as explained above, based on: either the correspondence relationship between the first driving current for testing purpose and the first in-testing vibration amplitude, or the correspondence relationship between the second driving current for testing purpose and the second in-testing vibration amplitude; and the first slope information stored in the first memory 16.

According to the third embodiment, the following effects are achieved in addition to achieving the effects according to the first and second embodiments.

In the third embodiment, the processor 15 corrects the property data based on the first treatment completion time, the second treatment completion time, the first driving current for testing purpose, and the second driving current for testing purpose. Then, the processor 15 calculates the control parameter based on the first treatment completion time, the second treatment completion time, the first driving current for testing purpose, the second driving current for testing purpose, and the post-correction property data.

Thus, there is no need to store a plurality of sets of property data in the first memory 16. Moreover, with reference to the grasping force corresponding to a plurality of sets of property data, even if the grasping force has changed depending on the shelf life, it becomes possible to calculate the appropriate control parameter corresponding to the changed grasping force.

Fourth Embodiment

Given below is the explanation of a fourth embodiment.

In the following explanation, the identical configuration to the first embodiment is referred to by the same reference numerals, and the detailed explanation is either not given again or given in a simplified manner.

Figure 13:
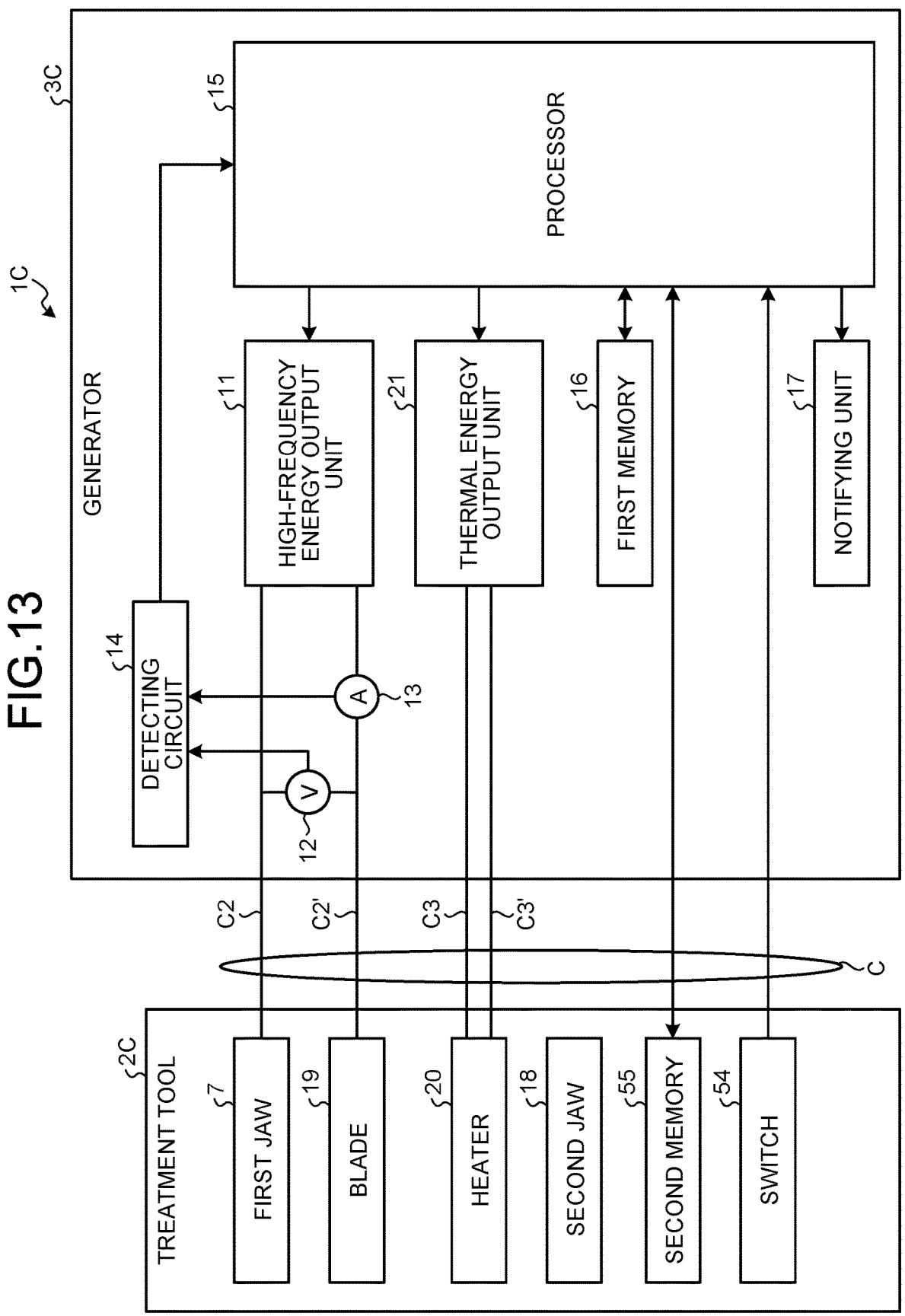
FIG. 13 is a block diagram illustrating a treatment system according to a fourth embodiment.

FIG. 13 is a block diagram illustrating a treatment system 10 according to a fourth embodiment.

In the treatment system 10 according to the fourth embodiment, thermal energy is used as the treatment energy, as against the treatment system 1 according to the first embodiment in which ultrasound energy is used as the treatment energy.

More particularly, as against the treatment tool 2 explained in the first embodiment, in a treatment tool 2C constituting the treatment system 10, as illustrated in FIG. 13, a jaw 18, a blade 19, and a heater 20 are used in place of the vibration transmitting material 9. In the following explanation, in order to distinguish between the jaw 7 and the jaw 18; the jaw 7 is referred to as a first jaw 7, and the jaw 18 is referred to as a second jaw 18.

The second jaw 18 is fixed to the leading end side Ar1 of the sheath 6 and opposite to the first jaw 7. The heater 20 and the blade 19 are laminated in that order on that face of the second jaw 18 which is opposite to the first jaw 7. Thus, according to the opening-closing operation of the first jaw 7, the target region gets grasped between the first jaw 7 and the blade 19.

The blade 19 is, for example, a thin copper plate. Thus, the blade 19 transmits the heat coming from the heater 20 to the target region. Moreover, the blade 19 is electrically connected to the high-frequency energy output unit 11 via the second current pathway C2' (see FIG. 13). Then, under the control of the processor 15, the high-frequency energy output unit 11 supplies a high-frequency voltage and a high-frequency current in between the jaw body 71 and the blade 19 via the pair of second current pathways C2 and C2'. As a result, a high-frequency current flows to the target region that is grasped between the jaw body 71 and the blade 19. Thus, the blade 19 also functions as a high-frequency electrode.

The heater 20 is, for example, a sheet heater. Although a specific example is not illustrated in the drawings, the heater 20 is manufactured as a result of vapor-deposition of an electrical resistance pattern on a sheet-like substrate made of an insulating material such as polyimide.

The electrical resistance pattern is formed, for example, in a U shape following the outer periphery shape of the heater 20. Moreover, when the treatment tool 2 is connected to the generator 3 using the electrical cable C, both ends of the electrical resistance pattern get electrically connected to a thermal energy output unit 21 (see FIG. 13), which constitutes a generator 3C, via a pair of third current pathways C3 and C3' constituting the electrical cable C.

The second jaw 18, the blade 19, and the heater 20 are equivalent to the first grasper.

As against the generator 3 explained in the first embodiment, in the generator 3C constituting the treatment system 10, as illustrated in FIG. 13, the thermal energy output unit 21 is used in place of the ultrasound energy output unit 10.

Under the control of the processor 15, the thermal energy output unit 21 supplies electrical power to the heater 20 (the electrical resistance pattern) via the pair of third current pathways C3 and C3'. As a result, the electrical resistance pattern produces heat. Then, the heat produced by the electrical resistance pattern gets applied from the blade 19 to the target region that is grasped between the jaw body 71 and the blade 19. In other words, thermal energy gets applied to the target region.

Meanwhile, from the voltage value and the current value of the electrical power supplied to the heater 20 (the electrical resistance pattern), the processor 15 measures the resistance of the heater 20 (the electrical resistance pattern) (hereinafter, referred to as the heater resistance) according to, for example, the fall-of-potential method. Then, in order to bring the temperature of the blade 19 (hereinafter, referred to as the treatment face temperature) to the target temperature, the processor 15 performs control to bring the heater resistance to the target resistance, while varying the electrical power supplied to the heater 20 (the electrical resistance pattern). That is, the heat having the target temperature is transmitted to the target region.

Given below is explanation about the control parameter calculation method performed by the processor 15.

Figure 14:
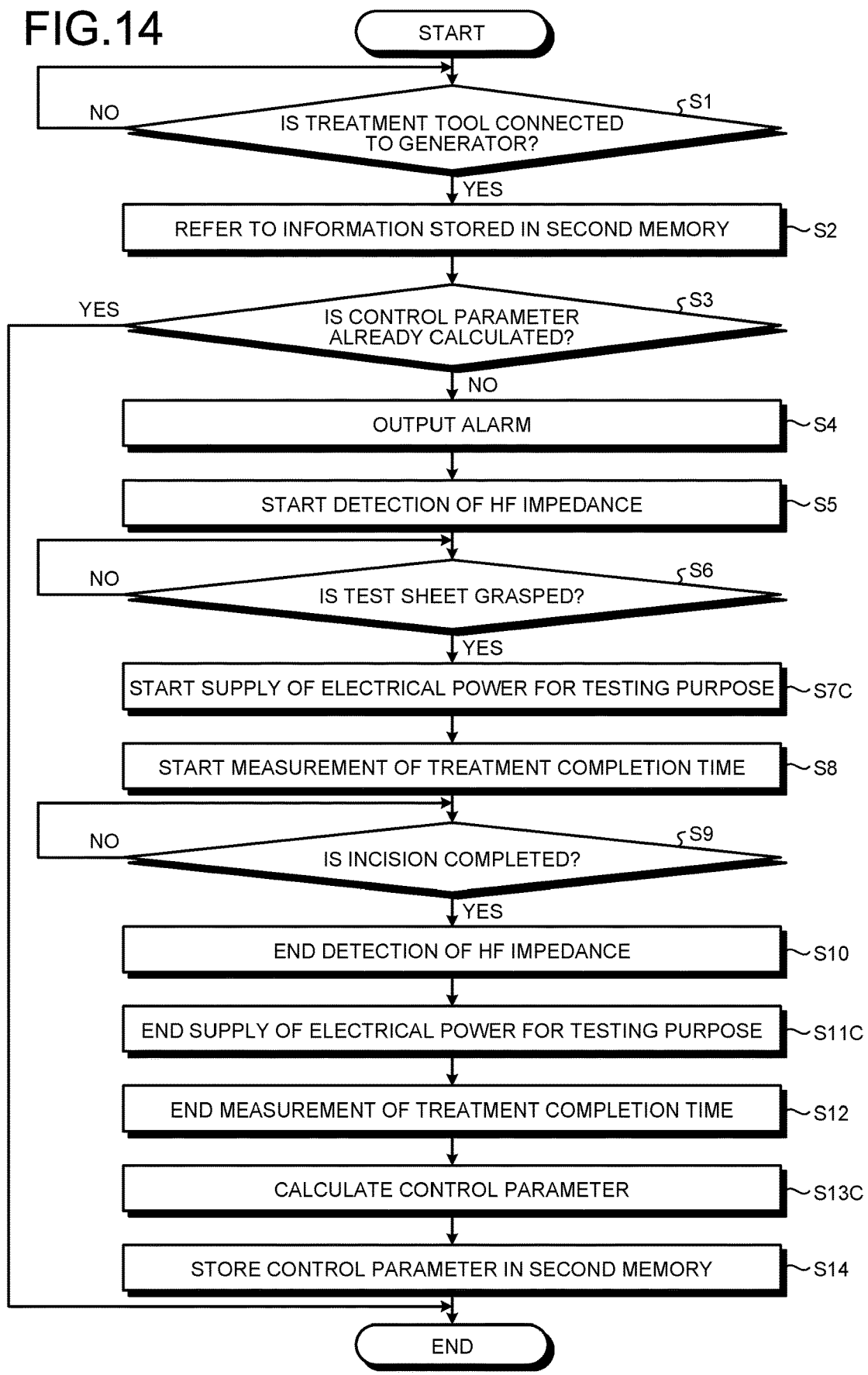
FIG. 14 is a flowchart for explaining the control parameter calculation method.

FIG. 14 is a flowchart for explaining the control parameter calculation method.

In the fourth embodiment, the heater resistance (i.e., the target resistance) that defines the treatment face temperature when the target region is treated represents the control parameter calculated according to the control parameter calculation method. That is, the control parameter is related to the treatment face temperature, and is equivalent to a temperature parameter.

As against the control parameter calculation method according to the first embodiment (see FIG. 5), in the control parameter calculation method according to the fourth embodiment, as illustrated in FIG. 14, the operations at Steps S7, S11, and S13 are substituted with the operations at Steps S7C, S11C, and S13C, respectively. Hence, the following explanation is focused on the operations at Steps S7C, S11C, and S13C.

When it is determined at Step S6 that the test sheet 4 is grasped (Yes at Step S6), the operation at Step S7C is performed.

More particularly, at Step S7C, the processor 15 controls the operations of the thermal energy output unit 21; starts the supply of the electrical power for testing purpose to the heater 20 (the electrical resistance pattern); and sets the heater resistance as the resistance for testing purpose. The resistance for testing purpose is equivalent to the "intensity of the treatment energy applied to the test material". Then, the heat produced by the electrical resistance pattern is applied from the blade 19 to the test sheet 4, and the incision of the first layer 41 is started.

The processor 15 performs the operation at Step S8 simultaneously with the operation at Step S7C, and then the system control proceeds to Step S9.

The operation at Step S11C is performed simultaneously with the operations at Steps S10 and S12.

More particularly, at Step S11C, the processor 15 stops the operations of the thermal energy output unit 21, and ends the supply of the electrical power for testing purpose to the heater 20 (the electrical resistance pattern).

The operation at Step S13C is performed after the operations at Steps S10, S11C, and S12 are performed.

More particularly, the processor 15 calculates the control parameter (the target resistance) based on: the treatment completion time measured at Steps S8, S9, S10, S11C, and S12; the resistance for testing purpose set at Steps S7C, S8, S9, S10, and S11C; and the property data, the reference completion time, a reference temperature, and second slope information (Step S13C).

Figure 15:
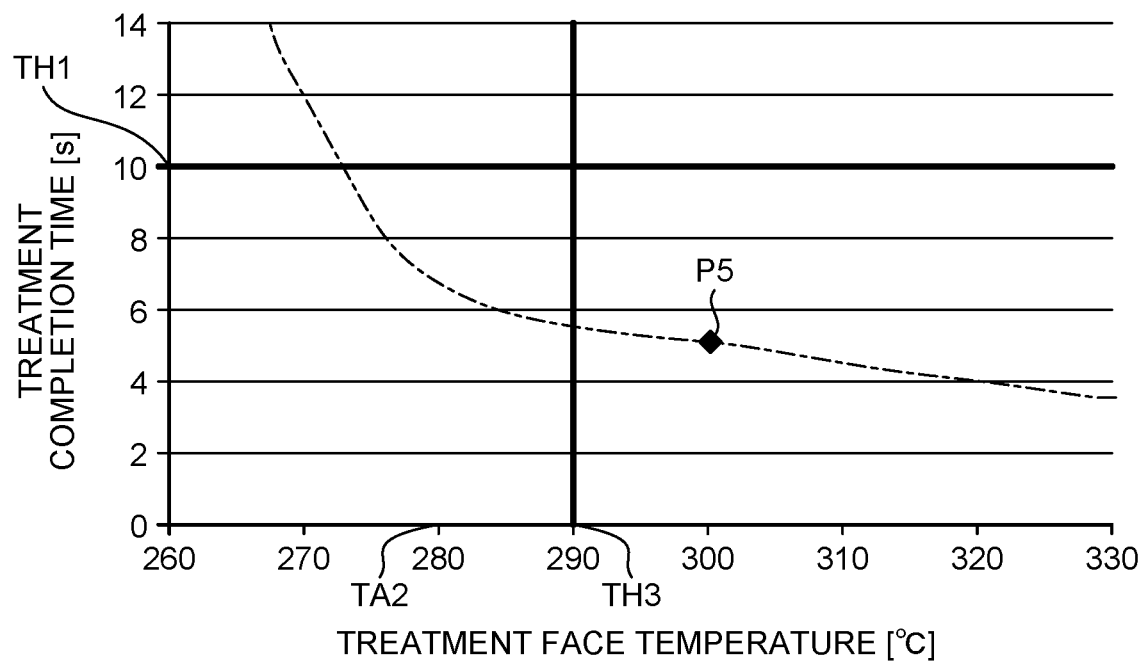
FIG. 15 is a diagram for explaining the operation performed at Step S13C.

FIG. 15 is a diagram for explaining the operation performed at Step S13C. More particularly, in FIG. 15, the horizontal axis represents the treatment face temperature [° C.], and the vertical axis represents the treatment completion time [s].

In the fourth embodiment, the property data stored in the first memory 16 is indicated by a curved line CL4 in the example illustrated in FIG. 15. More particularly, the property data represents the relationship between the treatment face temperature for heating the test sheet 4 (the first layer 41) and the treatment completion time spanning from the time of application of the heat having the treatment face temperature to the test sheet 4 to the time of incision of the first layer 41 of the test sheet 4. The curved line CL4 illustrated in FIG. 15 indicates that, when the heat having the treatment face temperature of 320 [° C.] is applied to the test sheet 4, the first layer 41 of the test sheet 4 gets incised in the treatment completion time of about 4 [s].

The reference temperature stored in the first memory 16 represents the reference value of the treatment face temperature. The reference temperature is set for bringing the heat-induced load on the treatment tool 2 down to or below a specific load. In the example illustrated in FIG. 15, a reference temperature TH3 is set to 290 [° C.].

Meanwhile, the relationship between the heater resistance and the treatment face temperature is a linear relationship. In the fourth embodiment, in that linear relationship, the second slope information stored in the first memory 16 indicates the ratio of the variation in the treatment face temperature with respect to the variation in the heater resistance (i.e., indicates the slope in the linear relationship).

At Step S13C, the processor 15 calculates the control parameter (the target resistance) in the following manner.

Firstly, based on the treatment completion time measured at Steps S8, S9, S10, S11C, and S12 and based on the property data stored in the first memory 16, the processor 15 sets the heater resistance as the resistance for testing purpose at Steps S7C, S8, S9, S19, and S11C; and figures out the approximate temperature actually attained by the blade 19 (hereinafter, referred to as an in-testing temperature). In the example illustrated in FIG. 15, since the treatment completion time of 5 [s] is measured at Steps S8, S9, S10, S11C, and S12; the processor 15 figures out that the temperature of 300 [° C.] corresponding to the time of 5 [s] in the curved line CL4 represents the in-testing temperature. In the example illustrated in FIG. 15, a point P5 represents the point corresponding to the treatment completion time, which is measured at Steps S8, S9, S10, S11C, and S12, and the in-testing temperature.

Then, based on the property data, the reference completion time, and the reference temperature stored in the first memory 16; the processor 15 sets the treatment face temperature (hereinafter, referred to as an in-treatment temperature) when the target region is treated. More particularly, the processor 15 sets, as the in-treatment temperature, the treatment face temperature that corresponds to the treatment completion time in the curved line CL4 equal to or shorter than the reference completion time and that is equal to or lower than the reference temperature. In the example illustrated in FIG. 15, for example, the treatment face temperature of 280 [° C.] is set as an in-treatment temperature TA2 that is in the range between and including the temperature of 273 [° C.] corresponding to the reference completion time TH1 of 10 [s] in the curved line CL4 and the reference temperature TH3 of 290 [° C.].

Then, based on the correspondence relationship between the resistance for testing purpose, which is set at Steps S7C, S8, S9, S10, and S11C, and the in-testing temperature, and based on the second slope information (the information indicating the ratio of the variation in the treatment face temperature with respect to the heater resistance) stored in the first memory 16; the processor 15 calculates the target resistance (the control parameter) that is required in obtaining the in-treatment temperature TA2 set as explained above.

After the operation at Step S13C is performed, the system control proceeds to Step S14.

Subsequently, when treating the target region in response to an output start operation performed by the operator, such as a medical practitioner, using the switch 54; the processor 15 refers to the control parameter (the target resistance) stored in the second memory 55, and supplies the input electrical power to the heater 20 so that the heater resistance becomes equal to the target resistance. As a result, the blade 19 gets heated to the in-treatment temperature TA2, and the heat having the in-treatment temperature TA2 gets applied to the target region.

As explained in the fourth embodiment, even when heat energy is used as the treatment energy, it becomes possible to achieve the identical effects to the effects achieved in the first embodiment.

Other Embodiments

Till now, the explanation was given about the embodiments of the disclosure. However, the disclosure is not limited by the first to fourth embodiments described above.

In the first to fourth embodiments described above, the first memory 16 according to the disclosure is disposed in the generator 3. However, that is not the only possible case, and alternatively the first memory 16 can be disposed in the treatment tool 2.

In the first to fourth embodiments described above, in order to treat the target region, a configuration is adapted in which ultrasound energy as well as high frequency energy is applied to the target region (refer to the first to third embodiments), or a configuration is adapted in which high frequency energy as well as thermal energy is applied to the target region (refer to the fourth embodiment). However, the disclosure is not limited to those cases.

For example, in the fourth embodiment, a configuration can be adapted in which the target region is treated by applying only thermal energy to it. In that case, regarding the incision detection method for determining at Step S9 whether or not the incision of the first layer 41 is completed, it is possible to implement the following method.

FIGS. 16 to 19 are diagrams illustrating a first modification example of the incision detection method. More particularly, in FIGS. 16 and 17, the behavior of the heater resistance and the input electrical power is illustrated in the case when the first layer 41 is incised. On the other hand, in FIGS. 18 and 19, the behavior of the heater resistance and the input electrical power is illustrated in the case when the first layer 41 is not incised.

Figure 17:
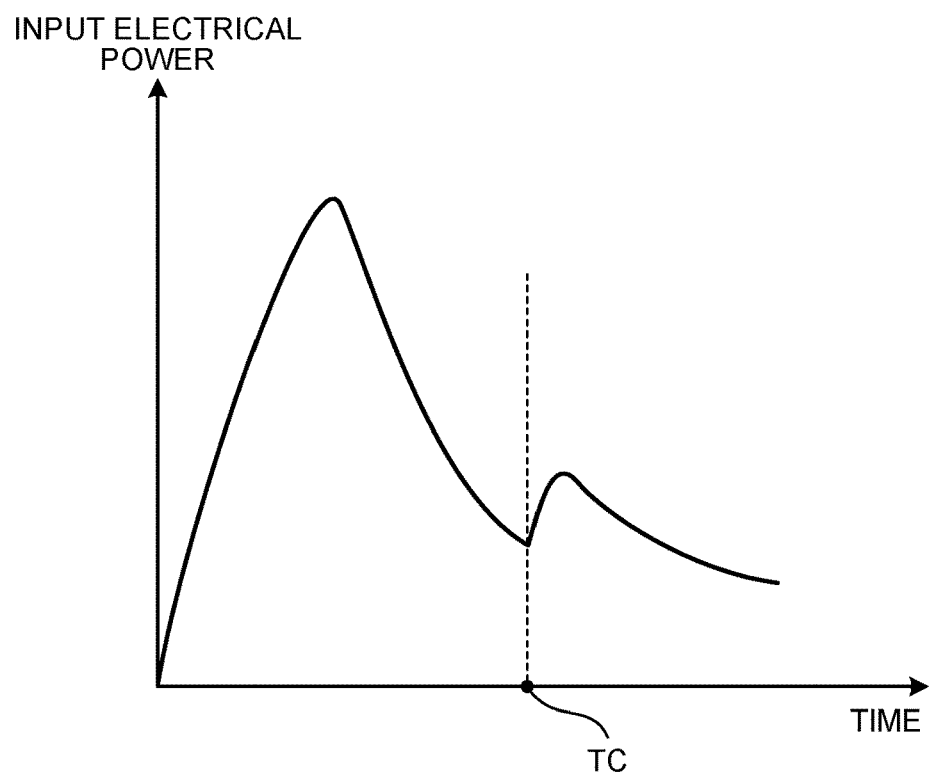
Figure 19:
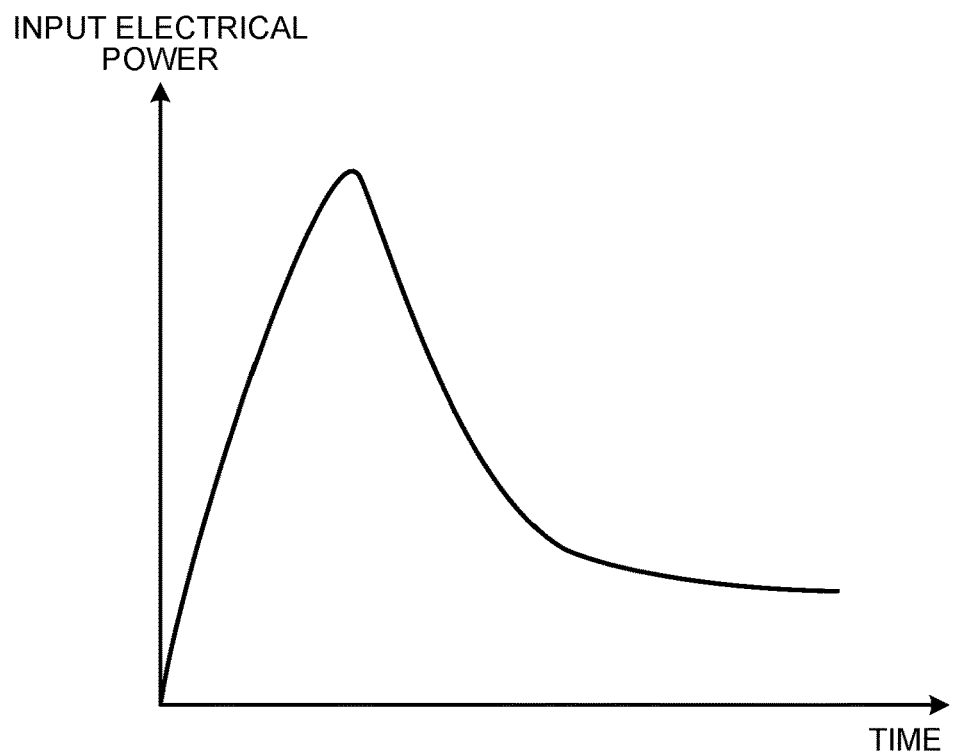

As illustrated in FIG. 17 or FIG. 19, the input electrical power supplied to the heater 20 (the electrical resistance pattern) has a single peak due to the control performed to bring the heater resistance to the target resistance.

Figure 16:
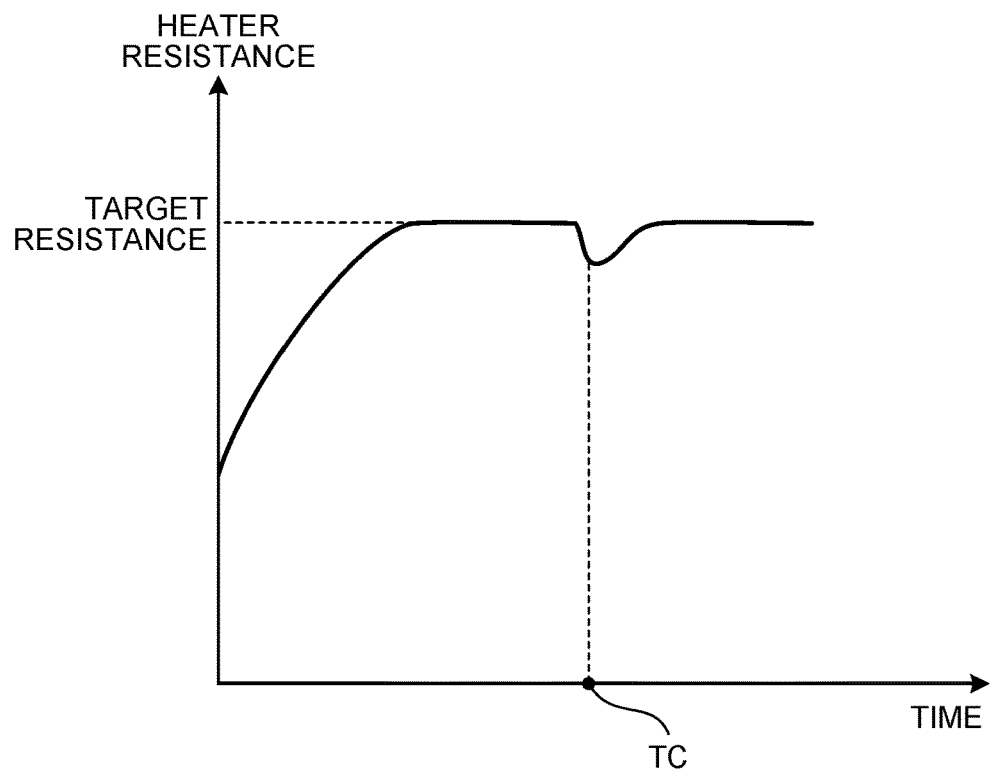
FIGS. 16 to 19 are diagrams illustrating a first modification example of an incision detection method.
Figure 18:
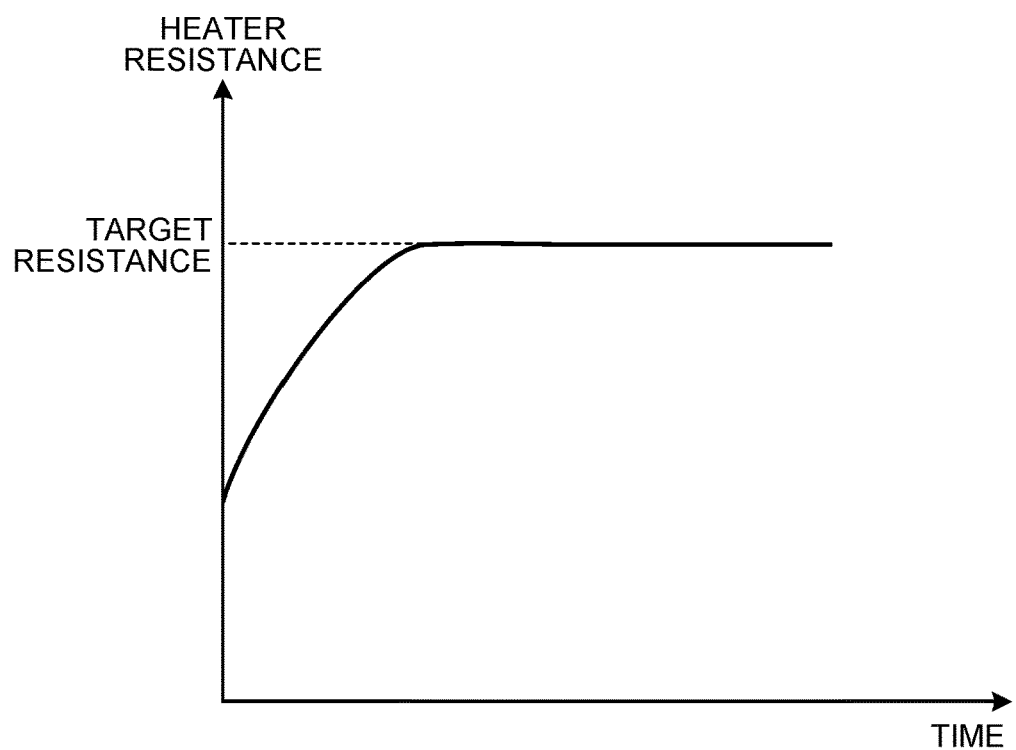

If FIGS. 16 and 17 are compared with FIGS. 18 and 19, when the first layer 41 is incised in a time TC (see FIGS. 16 and 17), there occur discontinuous changes in the behavior of the heater resistance and the input electrical power.

More particularly, when the first layer 41 is incised, the jaw body 71 and the blade 19 get thermally connected due to the second layer 42. Then, the blade 19 loses its heat to the jaw body 71 via the second layer 42, thereby resulting in a drop in the temperature of the blade 19. The drop in the temperature of the blade 19 causes a drop in the temperature of the heater 20, that is, causes a drop in the heater resistance. If it is attempted to maintain the heater resistance at the target resistance, then the input electrical power has to be increased. Hence, after the timing TC, there is a temporary increase in the input electrical power. As a result, at the timing TC, there occur discontinuous changes in the behavior of the heater resistance and the input electrical power.

Subsequently, at Step S9, when there are discontinuous changes in the behavior of the heater resistance and the input electrical power, the processor 15 determines that the incision of the first layer 41 is completed. That is, the heater resistance and the input electrical power are equivalent to "an index value indicating a treatment state of a test material".

Meanwhile, for example, in the first to third embodiments described above, a configuration can be adapted in which the target region is treated by applying only ultrasound energy to it. In that case, regarding the incision detection method for determining, at Step S9, whether or not the incision of the first layer 41 is completed, it is possible to implement the following method.

Figure 20:
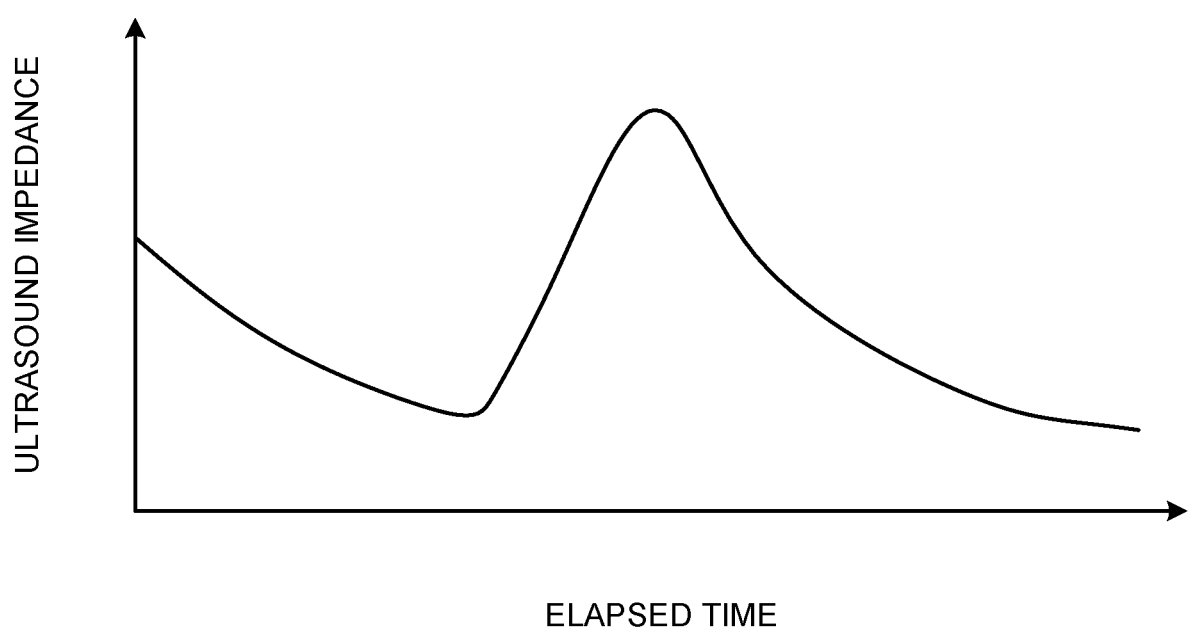
FIG. 20 is a diagram illustrating a second modification example of the incision detection method.

FIG. 20 is a diagram illustrating a second modification example of the incision detection method. More particularly, FIG. 20 is a diagram illustrating the behavior of the ultrasound impedance. The ultrasound impedance represents the impedance value calculated based on the voltage value and the current value of the alternating-current power supplied from the ultrasound energy output unit 10 to the ultrasound transducer 82.

As a result of the application of ultrasound vibrations from the treatment portion 91, the first layer 41 gradually goes on becoming thin, and the increase in the stress on the vibration transmitting material 9 leads to an increase in the ultrasound impedance as illustrated in FIG. 20. Then, once the first layer 41 gets incised, the jaw 7 and the vibration transmitting material 9 come into contact, and the pad 72 starts melting due to the ultrasound vibrations. As a result, the ultrasound impedance decreases.

At Step S9, when the ultrasound impedance exhibits the abovementioned behavior, the processor 15 determines that the incision of the first layer 41 is completed. Thus, the ultrasound impedance is equivalent to the "index value indicating a treatment state of a test material".

Thus, the treatment system and the control parameter calculation method according to the disclosure enable achieving the desired treatment performance.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A treatment system comprising:
a treatment tool configured to apply, to a living tissue, treatment energy generated according to electrical power supplied to the treatment tool, the treatment tool including:
  a first grasper configured to apply the treatment energy to the living tissue, and
  a second grasper configured to grasp the living tissue along with the first grasper; and
a generator including:
  a power circuit configured to supply the electrical power to the treatment tool,
  a detecting circuit configured to detect an index value indicating a treatment state of a test material which is grasped between the first grasper and the second grasper and to which the treatment energy is applied from the first grasper, and
  a processor configured to, based on the detected index value, measure a treatment completion time spanning from a start of application of the treatment energy to the test material to a completion of a specific treatment in the test material, wherein:
at least one of the treatment tool and the generator further includes a first memory configured to store property data that indicates (i) a property of the test material and (ii) a relationship between an intensity of the treatment energy applied to the test material and the treatment completion time, and
based on the measured treatment completion time, the intensity of the treatment energy applied to the test material, and the stored property data, the processor is configured to calculate a control parameter related to the intensity of the treatment energy when the living tissue is treated, and output the calculated control parameter to the power circuit to control the supply of the electrical power to the treatment tool.

2. The treatment system according to claim 1, wherein:
the treatment completion time includes:
  a first treatment completion time period when the treatment energy having a first intensity is applied to the test material, and
  a second treatment completion time period when the treatment energy having a second intensity is applied to the test material, the second intensity being different from the first intensity; and
the processor is configured to:
  measure the first treatment completion time and the second treatment completion time, and
  calculate the control parameter related to the intensity of the treatment energy based on the first treatment completion time, the second treatment completion time, the first intensity, the second intensity, and the stored property data.

3. The treatment system according to claim 2, wherein:
the first memory is configured to store a plurality of sets of property data corresponding to a plurality of mutually different grasping forces attributed to the first grasper and the second grasper, and
the processor is configured to calculate the control parameter related to the intensity of the treatment energy based on the first treatment completion time, the second treatment completion time, the first intensity, the second intensity, and the plurality of sets of property data.

4. The treatment system according to claim 2, wherein the processor is configured to:
correct the property data based on the first treatment completion time, the second treatment completion time, the first intensity, and the second intensity, and
calculate the control parameter related to the intensity of the treatment energy based on the first treatment completion time, the second treatment completion time, the first intensity, the second intensity, and the corrected property data.

5. The treatment system according to claim 1, wherein:
the treatment tool includes an ultrasound transducer configured to generate ultrasound vibrations representing the treatment energy according to the electrical power supplied to the treatment tool,
the first grasper includes a vibration transmitting material configured to transmit the ultrasound vibrations to the living tissue,
the property data indicates a relationship between an ultrasound parameter and the treatment completion time, the ultrasound parameter being related to vibration amplitude of the ultrasound vibrations, and
the control parameter indicates the ultrasound parameter when the living tissue is treated.

6. The treatment system according to claim 1, wherein:
the first grasper includes:
  a heater configured to produce heat representing the treatment energy according to the electrical power supplied to the heater, and
  a blade configured to transmit the produced heat to the living tissue,
the property data indicates a relationship between a temperature parameter and the treatment completion time, the temperature parameter being related to a temperature of the blade, and
the control parameter indicates the temperature parameter when the living tissue is treated.

7. The treatment system according to claim 1, wherein:
the treatment tool further includes a second memory configured to store history information indicating a calculation history of the control parameter, and
the processor is configured to update the history information stored in the second memory after calculating the control parameter.

8. A control parameter calculation method implemented by a processor of a generator, the method comprising:
measuring a treatment completion time spanning from a start of application of treatment energy to a test material to a completion of specific treatment in the test material, the treatment completion time being based on an index value indicating a treatment state of the test material that is grasped between a first grasper and a second grasper and to which treatment energy is applied from the first grasper;
calculating a control parameter related to an intensity of the treatment energy when a living tissue is treated based on the measured treatment completion time, the intensity of the treatment energy applied to the test material, and property data, the property data indicating a property of the test material and indicating a relationship between the intensity of the treatment energy applied to the test material and the treatment completion time; and
outputting the calculated control parameter to a power circuit to control supply of electrical power to a treatment tool.

* * * * *